United States Patent
Kim et al.

(10) Patent No.: US 11,791,990 B2
(45) Date of Patent: Oct. 17, 2023

(54) APPARATUS AND METHOD FOR MANAGING PERSONAL INFORMATION

(71) Applicant: ELECTRONICS AND TELECOMMUNICATIONS RESEARCH INSTITUTE, Daejeon (KR)

(72) Inventors: Seok-Hyun Kim, Daejeon (KR); Young-Seob Cho, Daejeon (KR); Geon-Woo Kim, Daejeon (KR); Soo-Hyung Kim, Daejeon (KR); Young-Sam Kim, Daejeon (KR); Jong-Hyouk Noh, Daejeon (KR); Kwan-Tae Cho, Daejeon (KR); Sang-Rae Cho, Chungcheongbuk-do (KR); Jin-Man Cho, Daejeon (KR); Seung-Hun Jin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 327 days.

(21) Appl. No.: 17/328,510

(22) Filed: May 24, 2021

(65) Prior Publication Data

US 2022/0173891 A1    Jun. 2, 2022

(30) Foreign Application Priority Data

Nov. 30, 2020    (KR) .................. 10-2020-0165135

(51) Int. Cl.
*H04L 29/06*    (2006.01)
*H04L 9/08*    (2006.01)
(Continued)

(52) U.S. Cl.
CPC .......... *H04L 9/0825* (2013.01); *H04L 9/3213* (2013.01); *H04L 9/3215* (2013.01); *H04L 9/3247* (2013.01); *H04L 9/50* (2022.05)

(58) Field of Classification Search
CPC ....... H04L 9/0877; H04L 9/0897; H04L 9/12; H04L 9/3236; H04L 9/3247;
(Continued)

(56) References Cited

U.S. PATENT DOCUMENTS 10,771,459 B2    9/2020    Kim et al.
2019/0058697 A1    2/2019    Chang et al.
(Continued)

FOREIGN PATENT DOCUMENTS

EP    3799642 B1  *  6/2022    ........... G06F 21/602
KR    10-1881045    7/2018
(Continued)

*Primary Examiner* — Sher A Khan
(74) *Attorney, Agent, or Firm* — KILE PARK REED & HOUTTEMAN PLLC

(57) ABSTRACT

Disclosed herein are an apparatus and method for managing personal information. The method includes a step in which a user terminal device registers the decentralized identification information of a user in a blockchain, receives the personal information of the user, stores the same in an endpoint for managing the personal information, and registers a personal information access policy for the personal information in a first server; a step in which the apparatus receives the decentralized identifier of the user, retrieves the decentralized identification information of the user, corresponding to the decentralized identifier, from the blockchain, and requests a personal information access token for accessing the personal information from the first server using the decentralized identification information; and a step in which the apparatus identifies the endpoint from the personal information access token, which is generated based (Continued)

on the personal information access policy, and retrieves the personal information from the endpoint.

17 Claims, 22 Drawing Sheets

(51) Int. Cl.
*H04L 9/32* (2006.01)
*H04L 9/00* (2022.01)

(58) Field of Classification Search
CPC . H04L 67/104; H04L 9/3234; H04L 67/1008; H04L 63/0823; G06F 21/57; G06F 21/602; G06F 21/71; G06F 21/33
See application file for complete search history.

(56) References Cited

U.S. PATENT DOCUMENTS

| | | |
|---|---|---|
| 2019/0164156 A1 | 5/2019 | Lindemann |
| 2019/0230092 A1* | 7/2019 | Patel ..................... H04L 9/3247 |
| 2019/0268332 A1 | 8/2019 | Wang |
| 2020/0127828 A1* | 4/2020 | Liu ....................... H04L 9/0637 |
| 2020/0145223 A1* | 5/2020 | Yang ..................... H04L 9/0877 |
| 2020/0145229 A1* | 5/2020 | Li ......................... G06F 16/953 |
| 2020/0153606 A1 | 5/2020 | Li et al. |
| 2020/0219150 A1* | 7/2020 | Johnston ............ G06Q 30/0282 |
| 2020/0228320 A1 | 7/2020 | Kim et al. |
| 2020/0296102 A1* | 9/2020 | Buchner ............. H04L 63/0884 |
| 2020/0301894 A1* | 9/2020 | Heo .................... H04L 63/1416 |
| 2020/0380144 A1* | 12/2020 | Murdoch .............. H04L 9/0643 |
| 2021/0351935 A1* | 11/2021 | Mishra ...................... H04L 9/50 |
| 2022/0078010 A1* | 3/2022 | Olson ....................... H04L 9/30 |

FOREIGN PATENT DOCUMENTS

| | | | | |
|---|---|---|---|---|
| KR | 10-2019-0114433 | 10/2019 | | |
| KR | 10-2020-0059908 | 5/2020 | | |
| KR | 10-2020-0092368 | 8/2020 | | |
| KR | 20220028870 A * | 8/2020 | | |
| WO | WO-2021020721 A1 * | 2/2021 | ............. | G06Q 10/04 |
| WO | WO-2022045419 A1 * | 3/2022 | ........... | G06F 21/602 |

\* cited by examiner

FIG. 8A

| LIST | SERVICE PROVIDER | SCOPE OF INFORMATION DISCLOSURE | PERMITTED HOURS |
|---|---|---|---|
| 1 | CREDIT CARD COMPANY | ALL | 07:00~24:00 |
| 2 | MARKETING COMPANY | PHONE NUMBER | 07:00~24:00 |

BASIC INFORMATION | PERMISSION SETUP | NOTIFICATION

POLICY LIST

EDIT

ADD POLICY

FIG. 8C

| BASIC INFORMATION | PERMISSION SETUP | NOTIFICATION |

SERVICE PROVIDER

☐ MARKETING COMPANY
☑ CREDIT CARD COMPANY
☐ SURVEY COMPANY

NEXT

APPARATUS AND METHOD FOR MANAGING PERSONAL INFORMATION

CROSS REFERENCE TO RELATED APPLICATION

This application claims the benefit of Korean Patent Application No. 10-2020-0165135, filed Nov. 30, 2020, which is hereby incorporated by reference in its entirety into this application.

BACKGROUND OF THE INVENTION

1. Technical Field

The present invention relates generally to blockchain technology, and more particularly to technology for managing personal information using a blockchain.

2. Description of the Related Art

In order to use online service, a user has to provide specific kinds of personal information on the user to a service provider, and in this process, the user is prompted to agree to terms and conditions under which the service provider is able to manage various kinds of personal information and provide the same to third parties. However, various problems in which personal information of users is sold or provided for some purpose not specified in the terms and conditions, that is, merely for a specific purpose of the service provider, occur in personal information management systems. Furthermore, users have no way to check whether their personal information is carefully managed by a manager based on the terms governing provision of the personal information to third parties.

Accordingly, systems for enabling individual users to manage and use their information themselves are being adopted with the recent development of self-sovereign identity technology based on Decentralized Identifiers (DIDs). However, there is a limitation in that a user has to directly manage all the personal information of the user alone.

Meanwhile, Korean Patent No. 10-1881045, titled "System and method for providing medical information based on blockchain", discloses a system and method for providing medical information based on a blockchain, which are configured to store medical information in a blockchain and to provide the medical information of patients depending on the access permissions of a medical information requestor.

SUMMARY OF THE INVENTION

An object of the present invention is to enable a user to directly store and manage his/her personal information, to set access permissions for provision of the personal information to third parties, and to directly control whether to provide his/her personal information.

Another object of the present invention is to ensure security for sharing personal information by establishing a secure P2P cryptographic communication channel and to check and validate details on the use of the personal information in real time.

In order to accomplish the above objects, a method for managing personal information, performed by a personal-information management apparatus, according to an embodiment of the present invention includes registering, by a user terminal device, the decentralized identification information of a user in a blockchain, receiving, by the user terminal device, the personal information of the user, storing, by the user terminal device, the personal information in an endpoint for managing the personal information of the user, and registering, by the user terminal device, a personal information access policy for the personal information in a first server; receiving, by the personal-information management apparatus, the decentralized identifier of the user, retrieving, by the personal-information management apparatus, the decentralized identification information of the user, corresponding to the decentralized identifier of the user, from the blockchain, and requesting, by the personal-information management apparatus, a personal information access token for accessing the personal information from the first server using the decentralized identification information of the user; and identifying, by the personal-information management apparatus, the endpoint for managing the personal information of the user from the personal information access token that is generated based on the personal information access policy for the personal information and retrieving, by the personal-information management apparatus, the personal information of the user from the endpoint.

Here, registering the personal information access policy may be configured such that the user terminal device transmits a personal information access policy generation request statement, including the decentralized identifier of the endpoint for managing the personal information, to the first server.

Here, the endpoint may be any one of the user terminal device and a second server.

Here, registering the personal information access policy may be configured such that the user terminal device transmits a personal information access policy registration statement, including the decentralized identifier of the user and the personal information access policy, to the first server and such that the first server registers the personal information access policy when the decentralized identification information of the user is retrieved from the blockchain using the decentralized identifier of the user.

Here, registering the personal information access policy may be configured such that, when the decentralized identification information of the user is retrieved, the first server verifies the signature of the personal information access policy registration statement, which is signed with the private key of the decentralized identifier of the user, using the public key of the decentralized identifier of the user.

Here, requesting the personal information access token may be configured such that the personal-information management apparatus transmits a personal information access token request statement, including the decentralized identifier of the personal-information management apparatus and the decentralized identifier of the user, to the first server.

Here, requesting the personal information access token may be configured such that the first server retrieves the personal information access policy corresponding to the decentralized identifier of the user based on the personal information access token request statement and determines whether retrieval of the personal information is permitted based on the personal information access policy and the decentralized identifier of the personal-information management apparatus.

Here, requesting the personal information access token may be configured such that, when it is determined that the personal-information management apparatus is permitted to retrieve the personal information, the first server generates the personal information access token by including the decentralized identifier of the first server therein as the decentralized identifier of a policy manager and including information about the endpoint for managing the personal information therein.

Here, requesting the personal information access token may be configured such that, when it is determined that the personal-information management apparatus is not permitted to retrieve the personal information, the first server transmits notification to the user terminal device, and then modifies the personal information access policy only when permission to retrieve the personal information is obtained from the user terminal device, thereby generating the personal information access token.

Here, retrieving the personal information of the user may be configured such that the endpoint receives a personal information retrieval request statement including the personal information access token from the personal-information management apparatus and receives the decentralized identification information of a policy creator from the blockchain using the decentralized identifier of the policy creator included in the personal information access token.

Here, retrieving the personal information of the user may be configured such that, when the policy creator is determined to be the first server based on the decentralized identification information of the policy creator, the endpoint determines that verification of the personal information access token succeeds and transmits the personal information of the user to the personal-information management apparatus.

Here, retrieving the personal information of the user may be configured such that the endpoint establishes a cryptographic communication channel with the personal-information management apparatus based on the decentralized identification information of the personal-information management apparatus, receives the personal information retrieval request statement through the cryptographic communication channel, and transmits the personal information through the cryptographic communication channel.

Also, in order to accomplish the above objects, an apparatus for managing personal information according to an embodiment of the present invention includes one or more processors and executable memory for storing at least one program executed by the one or more processors. The at least one program may be configured to receive the decentralized identifier of a user, to retrieve the decentralized identification information of the user, corresponding to the decentralized identifier of the user, from a blockchain, to request a personal information access token for accessing the personal information from a first server using the decentralized identification information of the user, to identify an endpoint for managing the personal information of the user from the personal information access token that is generated based on a personal information access policy for the personal information, and to retrieve the personal information of the user from the endpoint. The user terminal device of the user may register the decentralized identification information of the user in the blockchain, receive the personal information of the user, store the same in the endpoint for managing the personal information of the user, and register the personal information access policy for the personal information in the first server.

Here, the user terminal device may transmit a personal information access policy generation request statement, including the decentralized identifier of the endpoint for managing the personal information, to the first server.

Here, the endpoint may be any one of the user terminal device and a second server.

Here, the user terminal device may transmit a personal information access policy registration statement, including the decentralized identifier of the user and the personal information access policy, to the first server, and the first server may register the personal information access policy when the decentralized identification information of the user is retrieved from the blockchain using the decentralized identifier of the user.

Here, when the decentralized identification information of the user is retrieved, the first server may verify the signature of the personal information access policy registration statement, which is signed with the private key of the decentralized identifier of the user, using the public key of the decentralized identifier of the user.

Here, the at least one program may transmit a personal information access token request statement, including the decentralized identifier of the apparatus and the decentralized identifier of the user, to the first server.

Here, the first server may retrieve the personal information access policy corresponding to the decentralized identifier of the user based on the personal information access token request statement, and may determine whether retrieval of the personal information is permitted based on the personal information access policy and the decentralized identifier of the apparatus.

Here, when it is determined that the apparatus is permitted to retrieve the personal information, the first server may generate the personal information access token by including the decentralized identifier of the first server therein as the decentralized identifier of a policy manager and including information about the endpoint for managing the personal information therein.

Here, the endpoint may receive a personal information retrieval request statement including the personal information access token from the apparatus, and may receive the decentralized identification information of a policy creator from the blockchain using the decentralized identifier of the policy creator included in the personal information access token.

Here, when the policy creator is determined to be the first server based on the decentralized identification information of the policy creator, the endpoint may determine that verification of the personal information access token succeeds and transmit the personal information of the user to the apparatus.

BRIEF DESCRIPTION OF THE DRAWINGS

The above and other objects, features and advantages of the present invention will be more clearly understood from the following detailed description taken in conjunction with the accompanying drawings, in which:

Figure 8D:
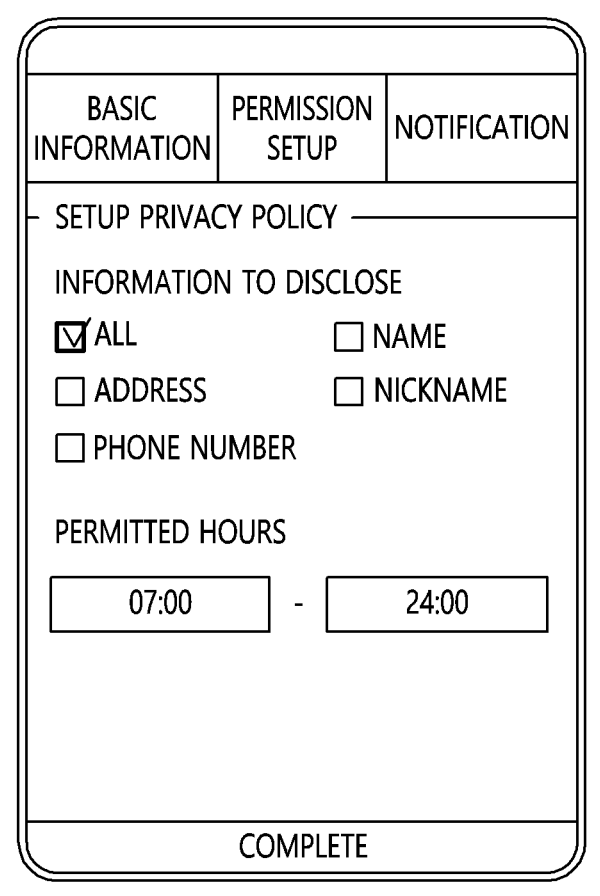

FIGS. 8A, 8B, 8C and 8D are views illustrating a user interface for managing permission settings according to an embodiment of the present invention;

DESCRIPTION OF THE PREFERRED EMBODIMENTS

Figure 1:
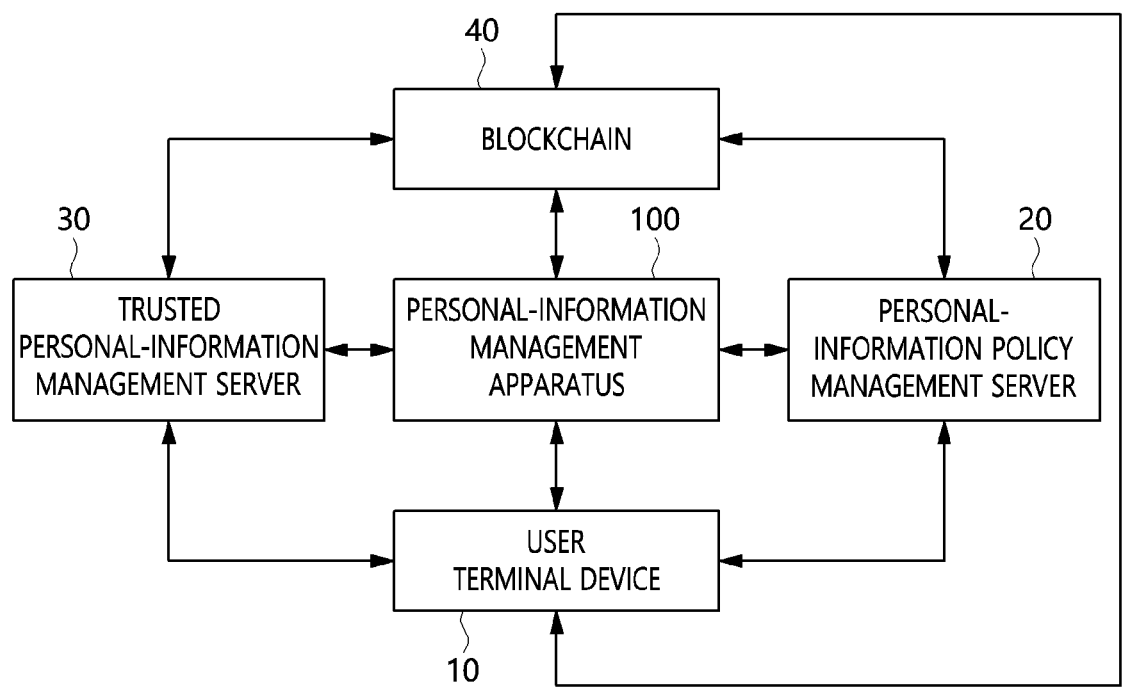
FIG. 1 is a block diagram illustrating a system for managing personal information according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

FIG. 1 is a block diagram illustrating a system for managing personal information according to an embodiment of the present invention.

Referring to FIG. 1, the system for managing personal information according to an embodiment of the present invention may include a user terminal device 10, a personal-information policy management server 20, a trusted personal-information management server 30, a blockchain 40, and a personal-information management apparatus 100.

The user terminal device 10 may set and manage the personal information access policy of the personal-information policy management server 20, and may directly manage the personal information of a user, rather than delegating the same to an external trust management server.

Here, in response to a request from the personal-information management apparatus 100 to retrieve personal information, the user terminal device 10 may verify an access token for the request to retrieve the personal information, and may provide the personal information to the personal-information management apparatus 100 only when the access token is valid.

The personal-information policy management server 20 may manage a personal information access policy for a user and terminal information for providing a notification service to the user terminal device 10.

Here, the personal-information policy management server 20 may verify the personal information access policy for a user in response to a request from the personal-information management apparatus 100 to retrieve the personal information of the user, and may issue a personal information access token for allowing the personal-information management apparatus 100 to retrieve the personal information.

The trusted personal-information management server 30 may manage the personal information of a user, verify the personal information access token issued by the personal-information policy management server 20, and provide the personal information based on the attribute information of the personal information access token.

Here, the trusted personal-information management server 30 may trust only the personal information access token issued by the personal-information policy management server 20 preset by the user terminal device 10.

The blockchain 40 may provide a DID management smart contract function through which Decentralized Identifier (DID) documents of all of the entities of the system for managing personal information can be registered, retrieved, updated, and deleted.

Here, the blockchain 40 may additionally manage a DID list for the personal-information management apparatus 100.

The personal-information management apparatus 100 may be an entity that requests personal information of a user.

Here, when the personal information of the user is managed in the user terminal device 10, the personal-information management apparatus 100 uses the push service of the user terminal device 10 in order to request the user terminal device 10 to retrieve the personal information using a personal information access token.

Here, when the personal information of the user is managed in the trusted personal-information management server 30, the personal-information management apparatus 100 may request the trusted personal-information management server 30 to retrieve the personal information using the personal information access token issued by the personal-information policy management server 20.

Here, in order to enable the personal-information management apparatus 100 to retrieve the personal information of the user, a policy related to permissions for retrieval of the corresponding personal information from the user may be preset.

Here, when it is provided with personal information from the user terminal device 10 or from the trusted personal-information management server 30, the personal-information management apparatus 100 may establish a secure P2P cryptographic communication channel based on a DID in order to securely receive the personal information, and may then receive the personal information through the secure P2P cryptographic communication channel.

Figure 2:
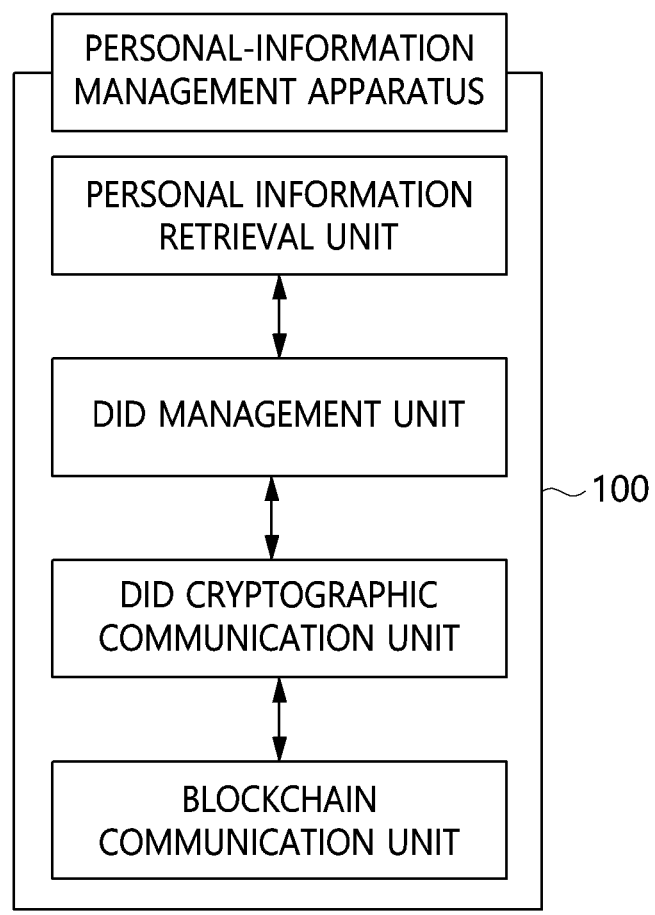
FIG. 2 is a block diagram illustrating an apparatus for managing personal information according to an embodiment of the present invention.

FIG. 2 is a block diagram illustrating an apparatus for managing personal information according to an embodiment of the present invention.

Referring to FIG. 2, the apparatus 100 for managing personal information according to an embodiment of the present invention may include a personal information retrieval unit, a DID management unit, a DID cryptographic communication unit, and a blockchain communication unit.

The personal information retrieval unit may retrieve the DID document of a user based on a user DID for retrieving personal information, may identify the endpoint of a personal-information policy management server 20 and the endpoint of a trusted personal-information management server 30, which are written in the retrieved DID document of the user, and may request retrieval of the personal information of the user.

The DID management unit may provide the functions of generating and managing a service DID and a service DID document.

The DID cryptographic communication unit may provide the function of establishing a cryptographic channel with another entity using authentication information of a DID document. For example, the DID cryptographic communication unit may provide a function similar to DID authentication.

The blockchain communication unit may provide the functions of registering a DID document in a blockchain, retrieving and deleting the same therefrom, and updating the same.

Figure 3:
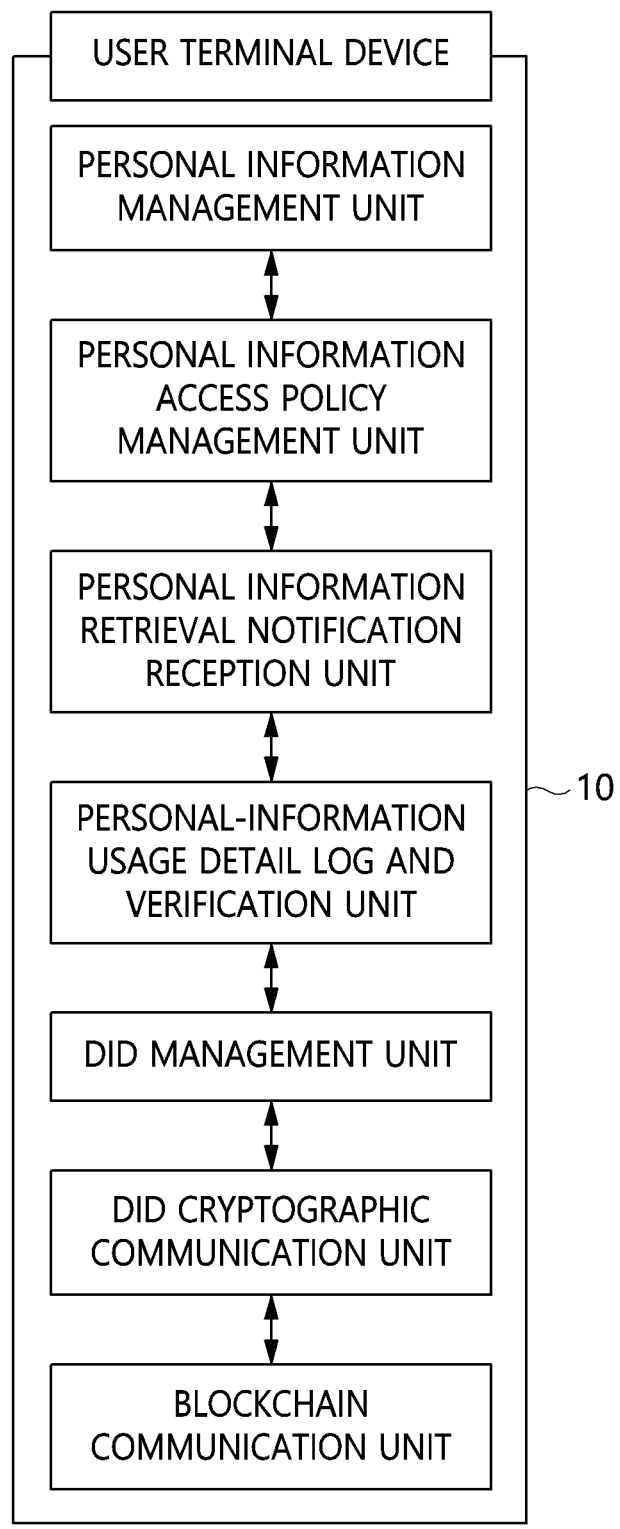
FIG. 3 is a block diagram illustrating a user terminal device according to an embodiment of the present invention.

FIG. 3 is a block diagram illustrating a user terminal device according to an embodiment of the present invention.

Referring to FIG. 3, the user terminal device 10 according to an embodiment of the present invention may include a personal information management unit, a personal information access policy management unit, a personal information retrieval notification reception unit, a personal-information usage detail log and verification unit, a DID management unit, a DID cryptographic communication unit, and a blockchain communication unit.

The personal information management unit may provide the function of directly managing the personal information of a user, rather than delegating the same to an external trusted institution.

The personal information access policy management unit may provide the function of setting the personal information access policy of the personal-information policy management server 20 and the function of verifying a personal information access token received from the personal-information management apparatus 100.

The personal information retrieval notification reception unit may provide the functions of receiving notification of illicit access to the personal information of a user from the personal-information policy management server 20, interpreting the notification, and outputting the same to the user.

The personal-information usage detail log and verification unit may manage details on provision of the personal information of a user based on the personal information access token issued by the personal-information policy management server 20 when the personal information of the user is managed and provided by the user terminal device 10.

Here, when the personal information of the user is managed and provided by the trusted personal-information management server 30, the personal-information usage detail log and verification unit may provide the functions of retrieving details of the use of the personal information in real time and cross-checking the usage details by comparing a record of issuance of an access token by the personal-information policy management server 20 with a log on the provision of the personal information by the trusted personal-information management server 30.

The DID management unit may provide the functions of generating and managing a user DID and a user DID document.

The DID cryptographic communication unit may provide the function of establishing a DID-based P2P cryptographic channel with another entity using the authentication information of a DID document. For example, the DID cryptographic communication unit may provide a function similar to DID authentication.

The blockchain communication unit provides the functions of registering a DID document in a blockchain, retrieving and deleting the same therefrom, and updating the same.

Figure 4:
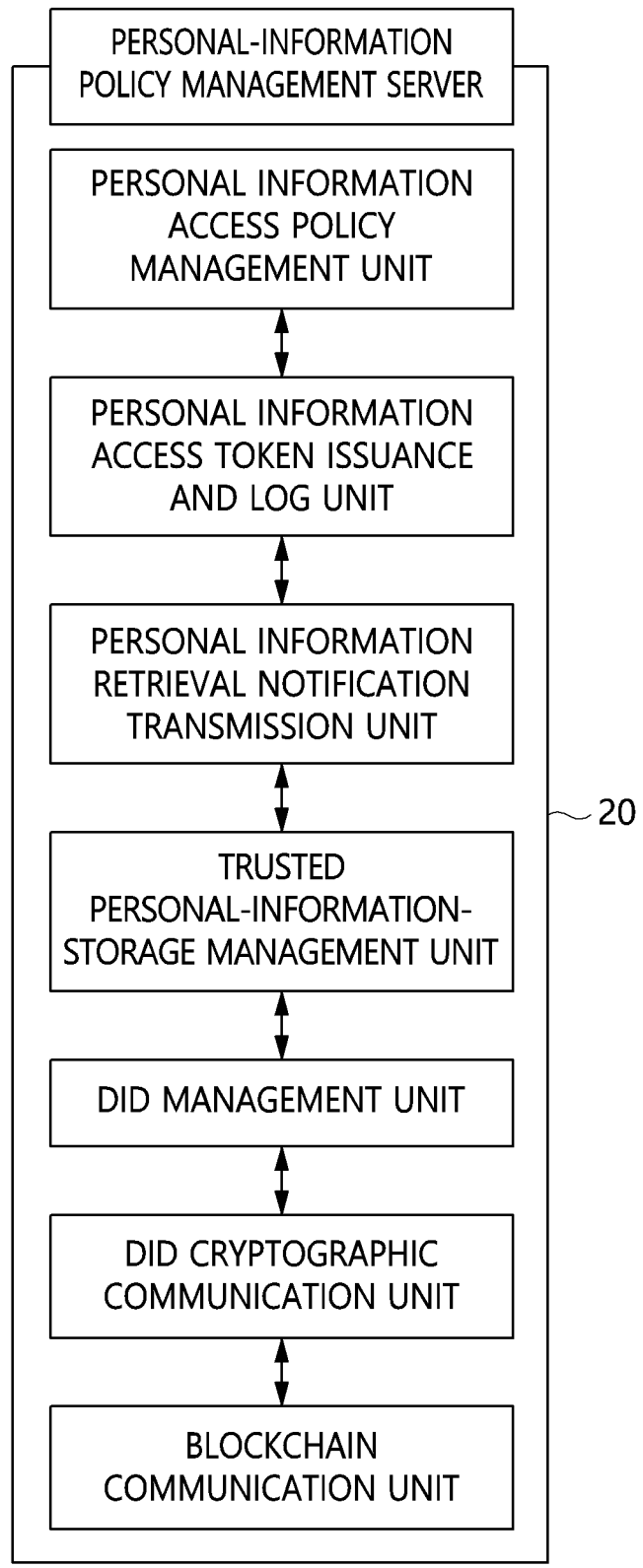
FIG. 4 is a block diagram illustrating a personal-information policy management server according to an embodiment of the present invention.

FIG. 4 is a block diagram illustrating a personal-information policy management server according to an embodiment of the present invention.

Referring to FIG. 4, the personal-information policy management server 20 according to an embodiment of the present invention may include a personal information access policy management unit, a personal information access token issuance and log unit, a personal information retrieval notification transmission unit, a trusted personal-information-storage management unit, a DID management unit, a DID cryptographic communication unit, and a blockchain communication unit.

The personal information access policy management unit may provide the function of managing a personal information access policy set by a user.

The personal information access token issuance and log unit may provide the functions of verifying a personal information access policy in response to a request to retrieve personal information, issuing a personal information access token when the request to retrieve the personal information is determined to be acceptable, and storing and managing a log on the issuance of the personal information access token.

The personal information retrieval notification transmission unit may provide the function of announcing an unauthorized request to retrieve personal information to the user terminal device 10 of a user, who is the owner of the corresponding personal information, using a notification service.

The trusted personal-information-storage management unit may provide the functions of registering and managing the trust DID of the trusted personal-information management server 30 when a user manages the personal information of the user using the trusted personal-information management server 30, rather than the user terminal device 10. The set trust DID of the trusted personal-information management server 30 may be included as an attribute value that is used when a personal information access token is issued.

The DID management unit provides the functions of generating and managing a policy DID and a policy DID document of the personal-information policy management server 20.

The DID cryptographic communication unit may provide the function of establishing a DID-based P2P cryptographic channel with another entity using the authentication information of a DID document. For example, the DID cryptographic communication unit may provide a function similar to DID authentication.

The blockchain communication unit provides the functions of registering a DID document in a blockchain, retrieving and deleting the same therefrom, and updating the same.

Figure 5:
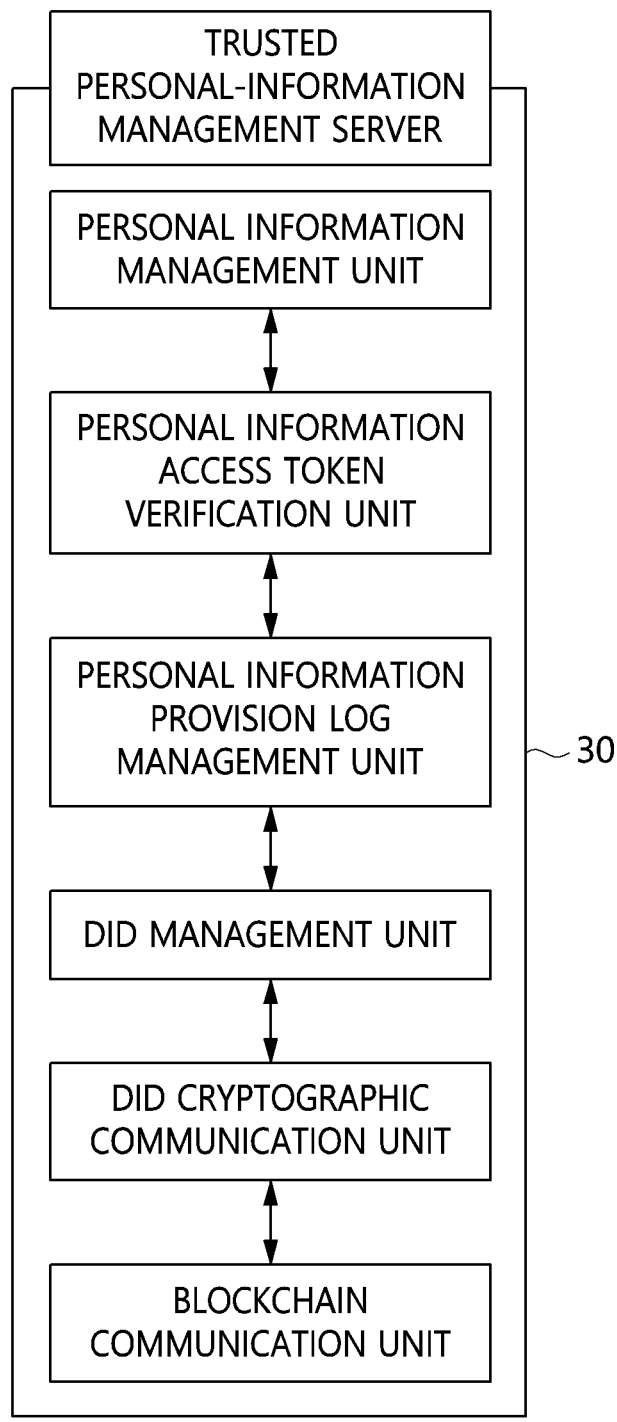
FIG. 5 is a block diagram illustrating a trusted personal-information management server according to an embodiment of the present invention.

FIG. 5 is a block diagram illustrating a trusted personal-information management server according to an embodiment of the present invention.

Referring to FIG. 5, the trusted personal-information management server 30 according to an embodiment of the present invention may include a personal information management unit, a personal information access token verification unit, a personal information provision log management unit, a DID management unit, a DID cryptographic communication unit, and a blockchain communication unit.

The personal information management unit may provide a function through which a user is able to input and manage the personal information of the user by directly accessing the management page of the trusted personal-information management server 30, rather than transmitting the personal information of the user to the trusted personal-information management server 30 through the user terminal device 10 so as to be stored therein.

Here, the personal information management unit sets the DID of the personal-information policy management server 20 of the user, whereby whether the issuer of the personal information access token, which is received when a request to retrieve personal information is received, matches the policy DID of the personal-information policy management server 20, which is preset by the user, may be determined.

The personal information access token verification unit may provide the function of verifying a personal information access token that is transmitted by the personal-information management apparatus 100 when it requests retrieval of the personal information of a user.

The personal information provision log management unit may provide the functions of recording and managing details on provision of personal information, which is provided in response to a request to retrieve the personal information, based on a personal information access token.

The DID management unit provides the functions of generating and managing a trust DID and a trust DID document of the trusted personal-information management server.

The DID cryptographic communication unit may provide the function of establishing a DID-based P2P cryptographic channel with another entity using the authentication information of a DID document. For example, the DID cryptographic communication unit provides a function similar to DID authentication.

The blockchain communication unit provides the functions of registering a DID document in a blockchain, retrieving and deleting the same therefrom, and updating the same.

Figure 6:
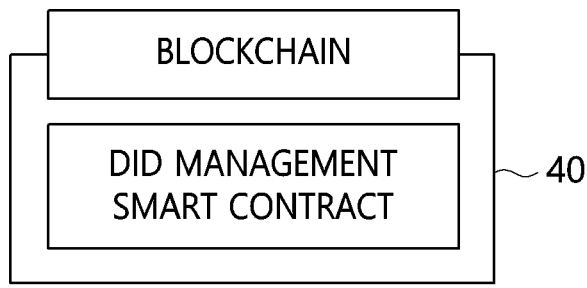
FIG. 6 is a block diagram illustrating a blockchain system according to an embodiment of the present invention.

FIG. 6 is a block diagram illustrating a blockchain system according to an embodiment of the present invention.

Referring to FIG. 6, the blockchain system according to an embodiment of the present invention may include a DID management smart contract.

The DID management smart contract may provide the functions of registering, retrieving, updating and deleting a DID document. Here, a function through which the service DID of the personal-information management apparatus 100 is additionally registered in the form of a DID list may be provided in the process of registering the DID document. Here, the service DID may be used to configure information about a requestor, who requests retrieval of personal information, when the personal-information policy management server 20 establishes a personal information access policy.

Pseudocode 1 shows a service DID document managed by the personal-information management apparatus according to an embodiment of the present invention.

[Pseudocode 1]

```
{
"@context": "https://www.ezid.com/data#",
    "did": "did:bid:service_abcdefgi_123456789",
    "publicKey": [
        {
            "id": "did:bid:service_abcdefgi_123456789#keys-1",
            "type": "RsaVerificationKey2018",
            "controller": "did:bid:service_abcdefgi_123456789",
            "publicKeyPem": "-----BEGIN PUBLIC KEY...END PUBLIC KEY-----
\\r\\n"
        }
    ],
    "authentication": [
        "did:bid:service_abcdefgi_123456789#keys-1",
    ],
    "serviceProvider": {
        "name": "serviceProvider",
        "homepageUrl": "https://www.provider.com/",
    },
    "proof": {
        "type": "RsaSignature2018",
        "created": "2020-03-30T06:28:19Z",
        "creator": "did:bid:service_abcdefgi_123456789#keys-1",
        "domain": "example.org",
        "nonce": "DD160B549205F5624DB51BCEAFC1A6376
5FCAF13",
        "proofValue":
"Au8VAk6NG9k1Kjz5mq1mBKtU55teCnBWKYVQnaJ9CdMz"
    }
}
```

Referring to Pseudocode 1, it can be seen that the service DID document according to an embodiment of the present invention takes a form in which attribute information 'serviceProvider' is added in a general DID document standardized by the World Wide Web Consortium (W3C) in order to configure a system for managing and providing personal information of a user.

The 'serviceProvider' attribute information may be used to configure information about a requestor who requests retrieval of personal information when the personal-information policy management server 20 establishes a personal information access policy.

Pseudocode 2 shows a user DID document managed by a user terminal device according to an embodiment of the present invention.

[Pseudocode 2]

```
{
"@context": "https://www.ezid.com/data#"
    "did": "did:bid:123456789abcdefghi",
    "publicKey": [
        {
            "id": "did:bid:123456789abcdefghi#keys-1",
            "type": "RsaVerificationKey2018",
            "controller": "did:bid:123456789abcdefghi",
            "publicKeyPem": " -----BEGIN PUBLIC KEY...END PUBLIC KEY-----
\\r\\n"
        }
    ],
```

-continued

[Pseudocode 2]

```
"authentication": [
    "did:bid:123456789abcdefghi#keys-1",
],
"service": [
    {
        "id": " did:bid:123456789abcdefghi#pps",
        "type": "privacyPolicyService"
        "serviceEndpoint": "https://pps.com"
    },
    {
        "id": " did:bid:123456789abcdefghi#pds"
        "type": "privacyDataService"
        "serviceEndpoint": "https://pds.com"
    }
],
"proof": {
    "type": "RsaSignature2018",
    "creator": "did:bid:123456789abcdefghi#keys-1",
    "created": "2019-07-02T00:36:28Z",
    "domain": "example.org",
    "nonce": "6E6F6E6365313233343536",
    "proofValue": "70726F6F6656616C7565"
    }
}
```

Referring to Pseudocode 2, it can be seen that a user DID document according to an embodiment of the present invention is configured by adding information about the personal-information policy management server used by a user in the 'service' attribute in a general DID document standardized by the W3C in order to configure the system for managing and providing personal information of the user, and information about a trusted personal-information management server may be further included therein when necessary.

Figure 7:
FIG. 7 is a view illustrating a user interface for managing basic information according to an embodiment of the present invention.
Figure 8B:
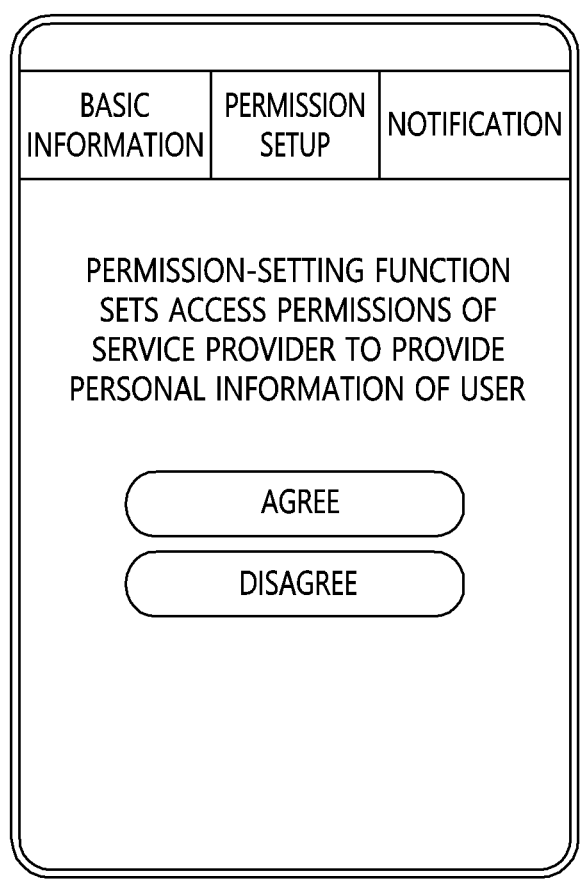

FIG. 7 is a view illustrating a user interface for managing basic information according to an embodiment of the present invention.

Referring to FIG. 7, it can be seen that a basic information management user interface for managing personal information of a user in a user terminal device 10 is illustrated.

As shown in FIG. 7, the name, the nickname, the address, the phone number, the email address, and the like of a user may be included in personal information, and various kinds of personal information such as Verifiable Credentials (VCs) may be further included therein.

FIGS. 8A, 8B, 8C and 8D are views illustrating a user interface for managing permission settings according to an embodiment of the present invention.

Referring to FIGS. 8A, 8B, 8C and 8D, it can be seen that a permission settings management user interface for establishing a personal information access policy in a user terminal device 10 is illustrated.

The permission settings management user interface may output a list of policies and receive a selection of policies. Here, the permission settings management user interface may provide a function for additional settings related to a service provider and privacy (the information to disclose).

Figure 9A:
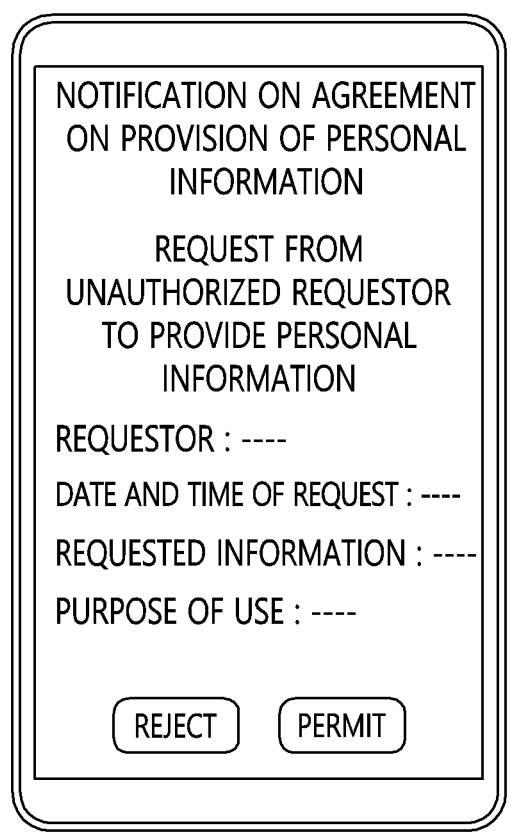
FIGS. 9A and 9B are views illustrating a user interface for managing notification settings according to an embodiment of the present invention.
Figure 9B:
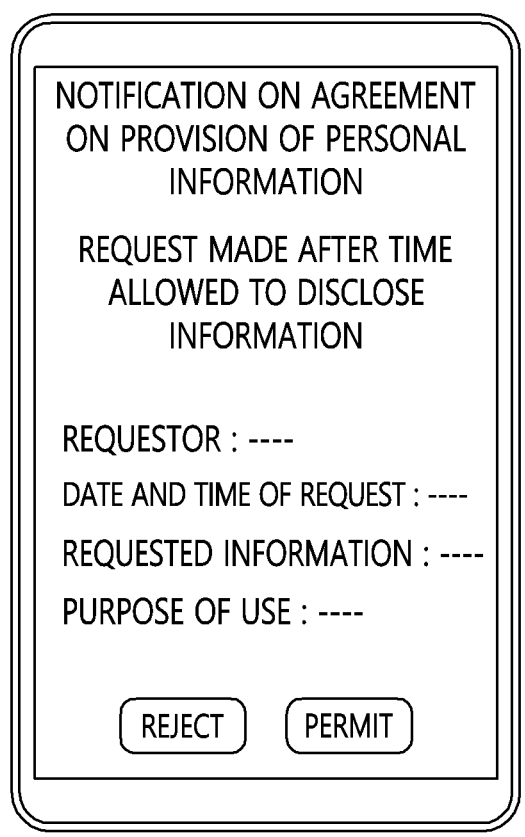

FIGS. 9A and 9B are views illustrating a user interface for managing notification settings according to an embodiment of the present invention.

Referring to FIGS. 9A and 9B, it can be seen that a notification settings management user interface in a user terminal device 10 is illustrated.

Here, when a request to provide the personal information of a user is received from an unauthorized user who does not have permission to access the personal information of the user or when a request to provide personal information is received after the hours during which information is allowed to be disclosed, notification including the requestor, the date and time of the request, the requested information, and the purpose of use thereof is output, and whether to allow the provision of the personal information may be received.

Figure 10:
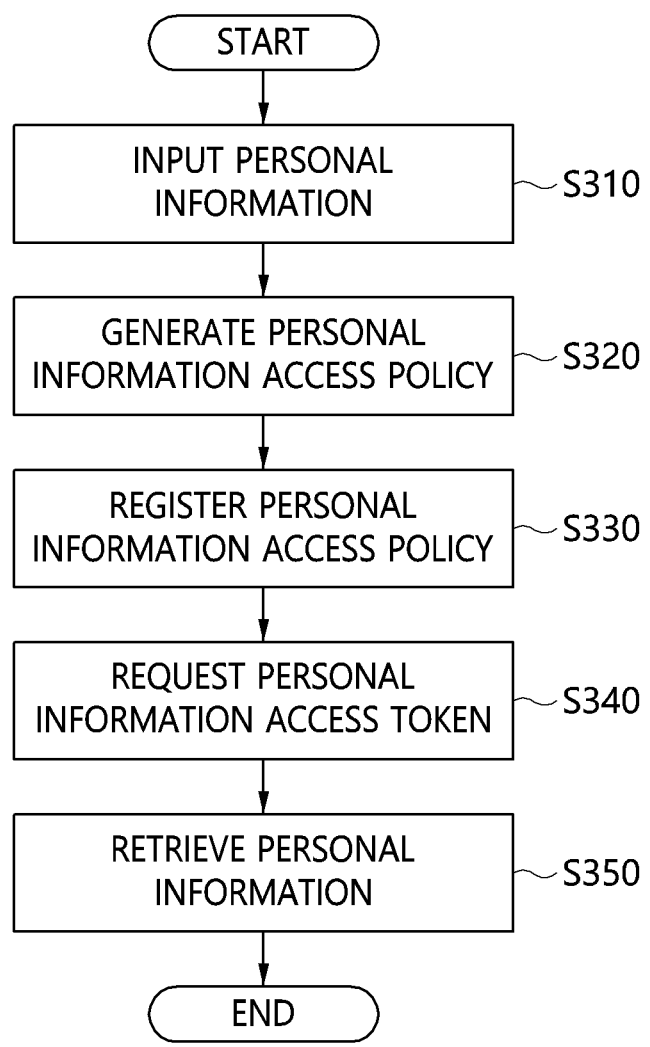
FIG. 10 is a flowchart illustrating a method for managing personal information according to an embodiment of the present invention.

FIG. 10 is a flowchart illustrating a method for managing personal information according to an embodiment of the present invention.

Referring to FIG. 10, in the method for managing personal information according to an embodiment of the present invention, first, personal information may be input at step S310.

That is, at step S310, the personal information of a user and a user DID may be input from the user through a service page (a reference site or the like) provided by a trusted personal-information management server 30, and may then be stored. The trusted personal-information management server 30 may securely manage the personal information of the user.

Here, at step S310, a user terminal device 10 may alternatively receive the personal information of the user and the user DID from the user and store the same.

Here, at step S310, the user may register the user DID and the policy DID of a personal-information policy management server 20 in the user terminal device 10 or the trusted personal-information management server 30 for management of the personal information.

Also, in the method for managing personal information according to an embodiment of the present invention, a personal information access policy may be generated at step S320.

That is, at step S320, the user terminal device 10 may first generate a user DID like S510.

Here, at step S320, the user may install a personal information policy management app for generating a personal information policy in the user terminal device 10.

Here, at step S320, when the personal information policy management app is installed, a user DID (a decentralized identifier) and a user DID document (decentralized identification information) may be automatically generated.

Here, at step S320, the user DID document may be generated by including 'service' attribute information in the user DID document including information about the personal-information policy management server 20 which provides the personal information policy management app.

Here, at step S320, the user terminal device 10 may request a blockchain 40 to register the user DID document therein.

Here, at step S320, the blockchain 40 may register the user DID document.

Here, at step S320, the blockchain 40 may return the result of registration of the user DID document to the user terminal device 10.

Here, at step S320, the personal information of the user (a name, a photograph, an address, a phone number, an email address, and the like) may be input through the user terminal device 10.

Here, at step S320, when the personal information of the user is managed in the trusted personal-information management server 30, rather than the user terminal device 10, information about the trusted personal-information management server 30 (the trust DID of the trusted personal-information management server 30) may be additionally input.

Here, at step S320, the input information may be stored in any one of the user terminal device 10 and the trusted personal-information management server 30, which is the endpoint at which the personal information is managed.

Here, at step S320, the user terminal device 10 may check user terminal information (e.g., Google FCM information) in order to receive details on violation of a personal information policy in real time from that time on.

The personal information of the user may be securely managed only in the user terminal, without being provided to the outside.

Here, at step S320, the user terminal device 10 may request the personal-information policy management server 20 to generate a personal information policy by transmitting a personal information policy generation statement, including the user DID, the user terminal information (Google FCM information and the like), and the information about the trusted personal-information management server (the trust DID thereof and the like), thereto.

Here, at step S320, the personal-information policy management server 20 may generate a personal information policy using the user DID, the user terminal information (Google FCM information and the like) and the information about the trusted personal-information management server (the trust DID and the like), which are included in the personal information policy generation statement.

Here, at step S320, the personal-information policy management server 20 may return the result of generation of the personal information policy to the user terminal device 10.

Here, at step S320, information of a personal-information management apparatus 100 for managing the personal information may be output through the explanation screen of the user terminal device 10 using the service DID document of the personal-information management apparatus 100, which is registered in the blockchain 40.

Henceforth, the user terminal information may be updated in real time by the user terminal device 10.

Here, at step S320, the personal-information management apparatus 100 may generate a service DID and a service DID document.

Here, at step S320, the personal-information management apparatus 100 may add the name thereof and the URL of a homepage on which a personal information management service is provided by the personal-information management apparatus 100 in the service DID document by including the same in the 'serviceProvider' attribute information.

Here, at step S320, the personal-information management apparatus 100 may request the blockchain 40 to register the service DID document therein.

Here, at step S320, the blockchain 40 may register the received DID document therein.

Here, at step S320, the service DID document may be verified, and a service DID list may be generated, or the service DID document may be added in a previously generated service DID list.

Here, at step S320, the service DID list may be generated by setting the key of the service DID list to 'spDidlist' and adding service DID documents in the form of "["spDID1", "spDID2", . . . ]" as the values of the service DID list.

Here, at step S320, the blockchain 40 may return the result of registration of the service DID document to the personal-information management apparatus 100.

Also, in the method for managing personal information according to an embodiment of the present invention, the personal information access policy may be registered at step S330.

That is, at step S330, the user terminal device 10 may generate a personal information access policy that includes the service DID of the personal-information management apparatus 100 and the content of the personal information access policy.

Here, the content of the personal information access policy may include information allowed to be disclosed and the time during which the personal information is permitted to be retrieved.

Here, at step S330, the user terminal device 10 may generate a personal information access policy registration request statement and transmit the same to the personal-information policy management server 20, thereby requesting registration of the personal information access policy.

Here, the personal information access policy registration request statement may include the user DID, the personal information access policy, and a signature signed with the private key of the user DID.

Here, at step S330, the personal-information policy management server 20 may check the user DID included in the personal information access policy registration request statement.

Here, at step S330, the personal-information policy management server 20 may request the blockchain 40 to retrieve the user DID document using the user DID.

Here, at step S330, the blockchain 40 may retrieve the user DID document corresponding to the user DID.

Here, at step S330, the blockchain 40 may transmit the retrieved user DID document to the personal-information policy management server 20.

Here, at step S330, the personal-information policy management server 20 may verify the signature of the personal information access policy registration request statement, which is signed with the private key of the user DID, using the public key of the user DID.

Here, at step S330, when verification of the personal information access policy registration request statement succeeds, the personal-information policy management server 20 may register the personal information access policy included in the personal information access policy registration request statement.

Here, at step S330, the personal-information policy management server 20 may transmit the result of registration of the personal information access policy to the user terminal device 10.

Also, in the method for managing personal information according to an embodiment of the present invention, a personal information access token may be requested at step S340.

That is, at step S340, the personal-information management apparatus 100 may receive the user DID of the user whose personal information is to be retrieved, and may check the user DID to retrieve.

Here, at step S340, the personal-information management apparatus 100 may request the blockchain 40 to retrieve the user DID document corresponding to the user DID.

Here, at step S340, the blockchain 40 may retrieve the user DID document.

Here, at step S340, the blockchain 40 may return the retrieved user DID document.

Here, at step S340, the personal-information management apparatus 100 may identify the endpoint as the personal-information policy management server 20 of the user based on 'type privacyPolicyService' that is written in the 'service' attribute information of the user DID document.

Here, at step S340, the personal-information management apparatus 100 may establish a DID cryptographic communication channel with the retrieved personal-information policy management server 20.

Here, at step S340, the personal-information policy management server 20 may check the service DID of the personal-information management apparatus 100.

Here, at step S340, the personal-information management apparatus 100 may generate a personal information access token request statement.

Here, at step S340, the personal-information management apparatus 100 may generate a personal information access token request statement including the service DID of the personal-information management apparatus 100, the user DID, and the information to request (personal information such as a name, a phone number, and the like).

Here, at step S340, the personal-information management apparatus 100 may transmit the generated personal information access token request statement to the personal-information policy management server 20.

Here, at step S340, the personal-information policy management server 20 may verify the personal information access token request statement, and may generate a personal information access token when the verification succeeds.

Here, at step S340, the personal-information policy management server 20 may verify whether the personal-information management apparatus 100 is permitted to retrieve the personal information of the user.

Here, at step S340, the personal-information policy management server 20 may decrypt the personal information access token request statement, and may verify the personal information access policy corresponding to the personal information access token request statement.

Here, at step S340, the personal-information policy management server 20 may retrieve the personal information access policy corresponding to the user DID based on the personal information access token request statement, and may determine whether the personal-information management apparatus 100 is permitted to retrieve the personal information based on the personal information access policy and the service DID of the personal-information management apparatus 100.

Here, at step S340, the personal-information policy management server 20 retrieves the personal information access policy based on the user DID and checks whether the service DID registered as the subject in the personal information access policy matches the service DID included in the personal information access token request statement, thereby checking permission to retrieve the personal information.

Here, at step S340, when it is determined that the personal-information management apparatus 100 is permitted to retrieve the personal information, a personal information access token, including the policy DID of the personal-information policy management server 20 and information about the endpoint that manages the personal information, may be generated.

Here, at step S340, when it is determined that the personal-information management apparatus 100 is not permitted to retrieve the personal information, notification for controlling the access to the personal information of the user, which includes information about the personal-information management apparatus 100, may be transmitted to the user terminal device 10.

Here, at step S340, when the user terminal device 10 permits the access by the personal-information management apparatus 100, the service DID of the personal-information management apparatus 100 may be automatically added to the personal information access policy or the policy may be modified, and a personal information access token for permitting the retrieval of the personal information may be generated and returned to the personal-information management apparatus 100.

The personal information access token may include an operation (retrieval), the DID of the requestor (service DID), the DID of the subject (user DID), the requested information (a name, a phone number and the like), permissions (read), the location of personal information storage (information about the endpoint), a signature creator (the policy DID of the personal-information policy management server 20), a signature (signed with the private key of the policy DID of the personal-information policy management server 20), and the like.

The information about the endpoint may be the location thereof, may be the user terminal information (Google FCM information and the like) for a push service when the endpoint is the user terminal device 10, or may be the trust DID of the trusted personal-information management server 30 when the endpoint is the trusted personal-information management server 30.

Here, at step S340, the personal-information policy management server 20 may transmit the generated personal information access token to the personal-information management apparatus 100.

Here, at step S340, a personal information access token response statement including the personal information access token may be generated, encrypted and transmitted to the personal-information management apparatus 100.

Here, at step S340, the personal-information management apparatus 100 may identify the endpoint for managing the personal information from the personal information access token.

Here, at step S340, the personal-information management apparatus 100 may acquire the user terminal information for requesting a push service of the user terminal device 10 or the trust DID of the trusted personal-information management server 30 depending on the endpoint identified from the personal information access token.

Also, in the method for managing personal information according to an embodiment of the present invention, the personal information may be retrieved at step S350.

That is, at step S350, the personal-information management apparatus 100 may establish a DID cryptographic communication channel with the user terminal device 10 using the user terminal information (e.g., Google FCM) for the push service, which is identified from the personal information access token.

Here, at step S350, the user terminal device 10 may identify the service DID of the personal-information management apparatus 100.

Here, at step S350, the personal-information management apparatus 100 may deliver a request to retrieve the personal information and the personal information access token together to the user terminal device 10 based on the DID cryptographic communication channel.

Here, at step S350, the user terminal device 10 may check the policy DID of the personal-information policy management server 20, which is the issuer of the access token, the policy DID being included in the personal information access token.

Here, at step S350, the user terminal device 10 may request the blockchain 40 to retrieve the DID document of the issuer of the access token in order to check if the policy DID corresponds to the personal-information policy management server 20.

Here, at step S350, the blockchain 40 may retrieve the DID document for the DID.

Here, at step S350, the blockchain 40 may transmit the DID document for the DID to the user terminal device 10.

Here, at step S350, the user terminal device 10 may acquire a public key from the DID document received from the blockchain 40, and may verify the signature of the personal information access token using the public key.

Here, at step S350, the user terminal device 10 may verify the attribute information of the personal information access token. First, whether the DID of the subject written in the access token matches the user DID of the user terminal device 10 may be checked, and then whether the service DID, which is checked at the time of establishing the DID cryptographic communication channel, matches the DID of the requestor written in the access token may be checked.

Here, at step S350, when both verification of the signature of the personal information access token and verification of the attribute information are completed, the user terminal device 10 may store a log on the provision of the personal information, and may retrieve the personal information of the user, which is requested by the personal-information management apparatus 100, from the local DB thereof.

Here, at step S350, the user terminal device 10 may provide the retrieved personal information to the personal-information management apparatus 100.

Figure 11:
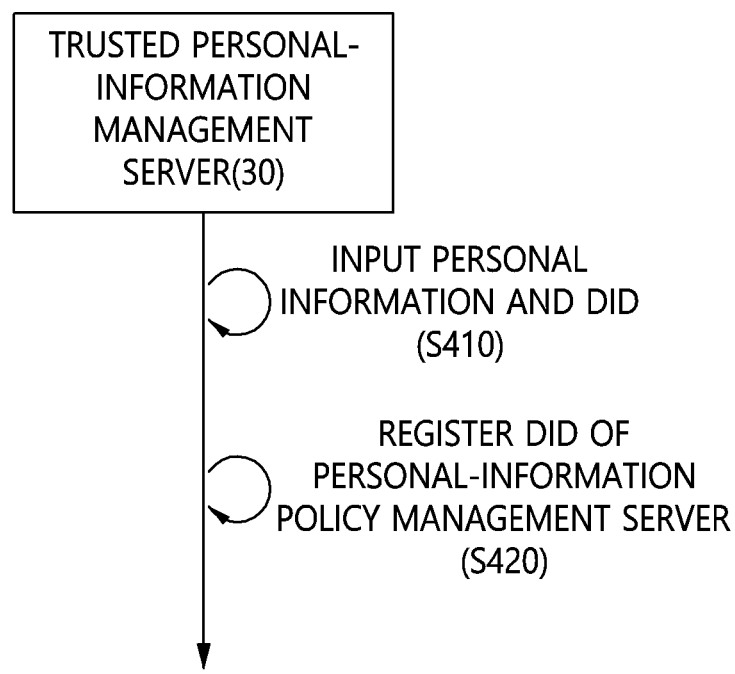
FIG. 11 is a sequence diagram illustrating a process of registering personal information according to an embodiment of the present invention.

FIG. 11 is a sequence diagram illustrating the process of registering personal information according to an embodiment of the present invention.

Referring to FIG. 11, in the process of registering personal information according to an embodiment of the present invention, first, the personal information of a user and a user DID may be input from the user through a service page (a reference site or the like) provided by a trusted personal-information management server 30, and may then be stored at step S410. The trusted personal-information management server 30 may securely manage the personal information of the user.

The trusted personal-information management server 30 may register the policy DID of a personal-information policy management server 20 at step S420.

Here, the personal-information policy management server 20 may determine whether to provide the personal information to third parties based on a personal information access token that is issued for the user DID.

Figure 12:
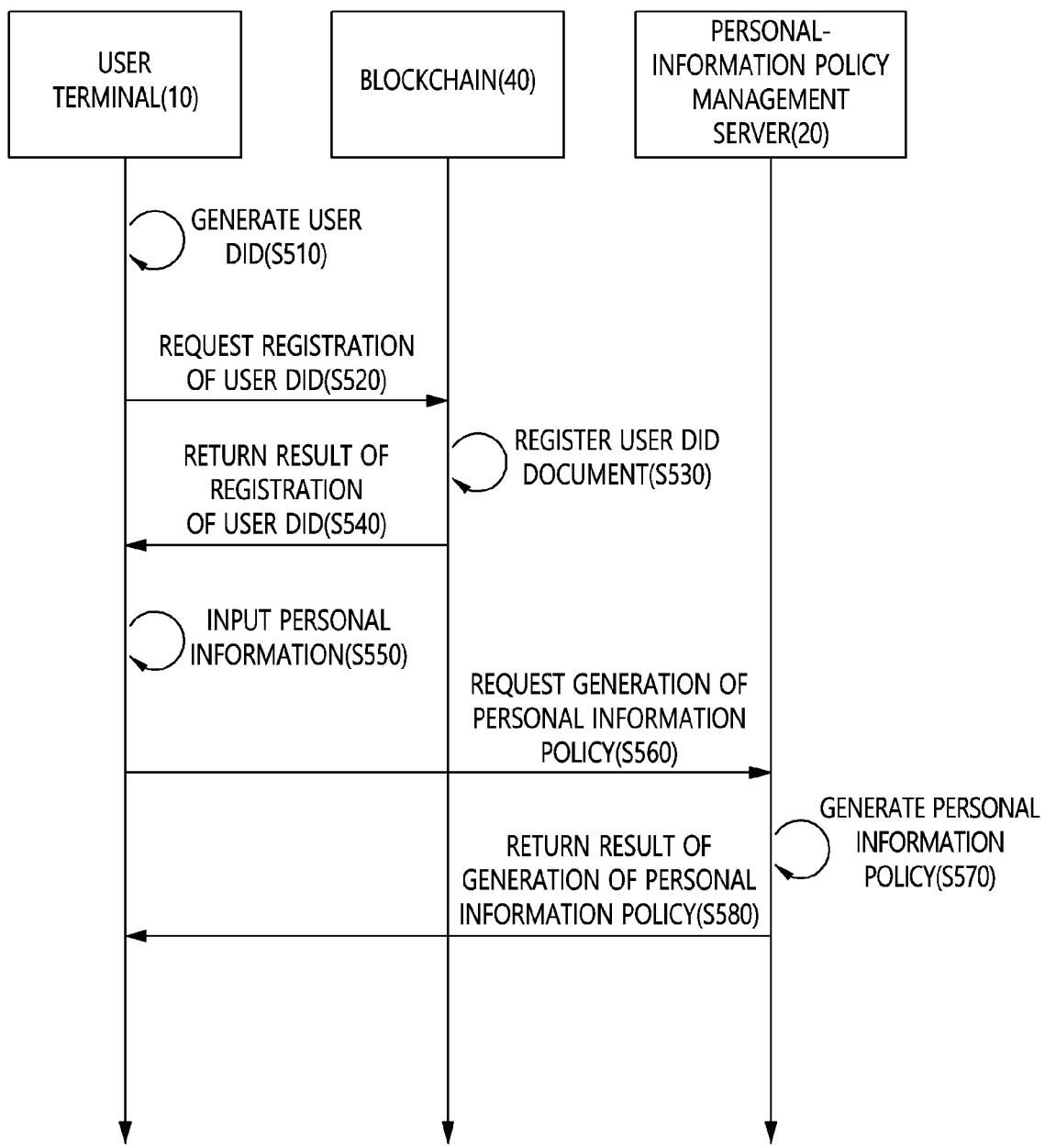
FIG. 12 is a sequence diagram illustrating a process of generating a personal information access policy according to an embodiment of the present invention.

FIG. 12 is a sequence diagram illustrating the process of generating a personal information access policy according to an embodiment of the present invention.

Referring to FIG. 12, a user terminal device 10 may generate a user DID at step S510.

Here, at step S510, first, a user may install a personal information policy management app for generating a personal information policy in the user terminal device 10.

Here, at step S510, when the personal information policy management app is installed, a user DID (a decentralized identifier) and a user DID document (decentralized identification information) may be automatically generated.

Here, at step S510, the user DID document may be generated by including information about a personal-information policy management server 20, which provides the personal information policy management app, in 'service' attribute information in the DID document.

At step S520, the user terminal device 10 may request a blockchain 40 to register the user DID document therein.

At step S530, the blockchain 40 may register the user DID document.

At step S540, the blockchain 40 may return the result of registration of the user DID document to the user terminal device 10.

At step S550, the user may input the personal information of the user (a name, a photograph, an address, a phone number, an email address, and the like) through the user terminal device 10.

Here, at step S550, when the personal information of the user is managed in a trusted personal-information management server 30, rather than the user terminal device 10, information about the trusted personal-information management server 30 (the trust DID of the trusted personal-information management server 30) may be additionally input.

Here, at step S550, the input information may be stored in any one of the user terminal device 10 and the trusted personal-information management server 30, which is the endpoint at which the personal information is managed.

Here, at step S550, the user terminal device 10 may check user terminal information (e.g., Google FCM information) in order to receive details on violation of a personal information policy in real time from that time on.

The personal information of the user may be securely managed only in the user terminal, without being provided to the outside.

At step S560, the user terminal device 10 may request the personal-information policy management server 20 to generate a personal information policy by transmitting a personal information policy generation statement, including the user DID, the user terminal information (Google FCM information and the like), and the information about the trusted personal-information management server (the trust DID thereof and the like), thereto.

At step S570, the personal-information policy management server 20 may generate a personal information policy using the user DID, the user terminal information (Google FCM information and the like) and the information about the trusted personal-information management server (the trust DID and the like), which are included in the personal information policy generation statement.

At step S580, the personal-information policy management server 20 may return the result of generation of the personal information policy to the user terminal device 10.

Here, at step S580, information of a personal-information management apparatus 100 for managing the personal information may be output through the explanation screen of the user terminal device 10 using the service DID document of the personal-information management apparatus 100, which is registered in the blockchain 40.

Henceforth, the user terminal information may be updated in real time by the user terminal device 10.

Figure 13:
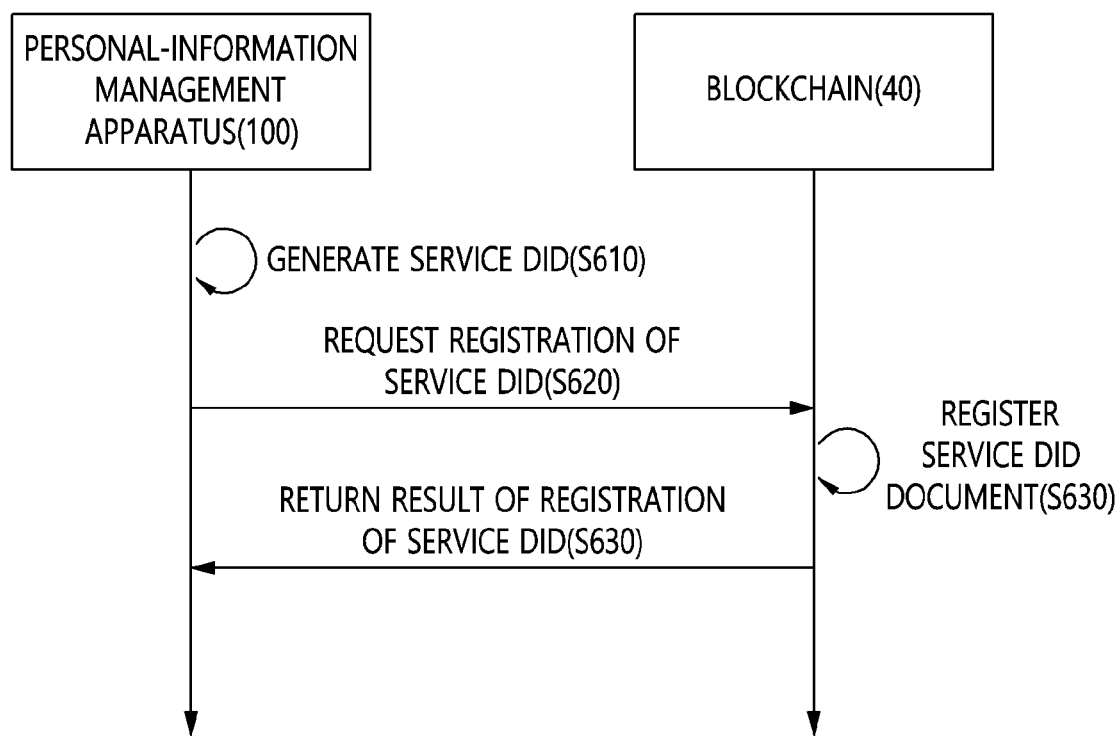
FIG. 13 is a sequence diagram illustrating a process of registering a service DID document according to an embodiment of the present invention.

FIG. 13 is a sequence diagram illustrating the process of registering a service DID document according to an embodiment of the present invention.

Referring to FIG. 13, a personal-information management apparatus 100 may generate a service DID and a service DID document at step S610.

That is, at step S610, the personal-information management apparatus 100 may add the name thereof and the URL of a homepage on which a personal information management service is provided by the personal-information management apparatus 100 in the service DID document by including the same in the 'serviceProvider' attribute information.

At step S620, the personal-information management apparatus 100 may request a blockchain 40 to register the service DID document therein.

At step S630, the blockchain 40 may register the received DID document therein.

Here, at step S630, the service DID document may be verified, and a service DID list may be generated, or the service DID document may be added in a previously generated service DID list.

For example, at step S630, the service DID list may be generated by setting the key of the service DID list to 'spDidlist' and adding service DID documents in the form of "["spDID1", "spDID2", . . . ]" as the values of the service DID list.

At step S640, the blockchain 40 may return the result of registration of the service DID document to the personal-information management apparatus 100.

Figure 14:
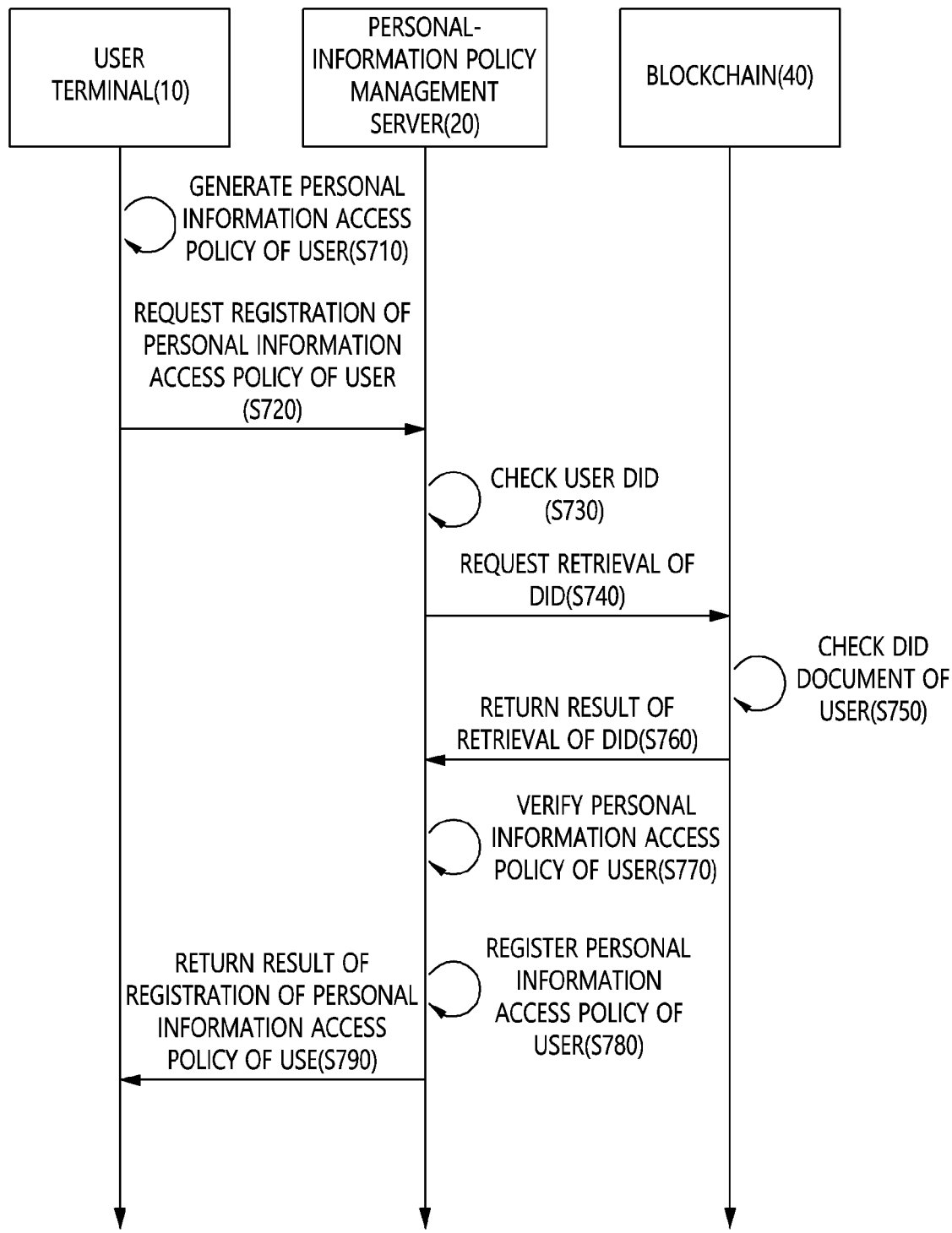
FIG. 14 is a sequence diagram illustrating a process of registering a personal information access policy according to an embodiment of the present invention.

FIG. 14 is a sequence diagram illustrating the process of registering a personal information access policy according to an embodiment of the present invention.

Referring to FIG. 14, at step S710, a user terminal device 10 may generate a personal information access policy including the service DID of a personal-information management apparatus 100 and the content of the personal information access policy.

Here, the content of the personal information access policy may include information allowed to be disclosed and the time during which the personal information is permitted to be retrieved.

At step S720, the user terminal device 10 may generate a personal information access policy registration request statement and transmit the same to a personal-information policy management server 20, thereby requesting registration of the personal information access policy.

Here, the personal information access policy registration request statement may include a user DID, the personal information access policy, and a signature signed with the private key of the user DID.

At step S730, the personal-information policy management server 20 may check the user DID included in the personal information access policy registration request statement.

At step S740, the personal-information policy management server 20 may request a blockchain 40 to retrieve a user DID document using the user DID.

At step S750, the blockchain 40 may retrieve the user DID document corresponding to the user DID.

At step S760, the blockchain 40 may transmit the retrieved user DID document to the personal-information policy management server 20.

At step S770, the personal-information policy management server 20 may verify the signature of the personal information access policy registration request statement, which is signed with the private key of the user DID, using the public key of the user DID.

At step S780, when verification of the personal information access policy registration request statement succeeds, the personal-information policy management server 20 may register the personal information access policy included in the personal information access policy registration request statement.

At step S790, the personal-information policy management server 20 may transmit the result of registration of the personal information access policy to the user terminal device 10.

Figure 15:
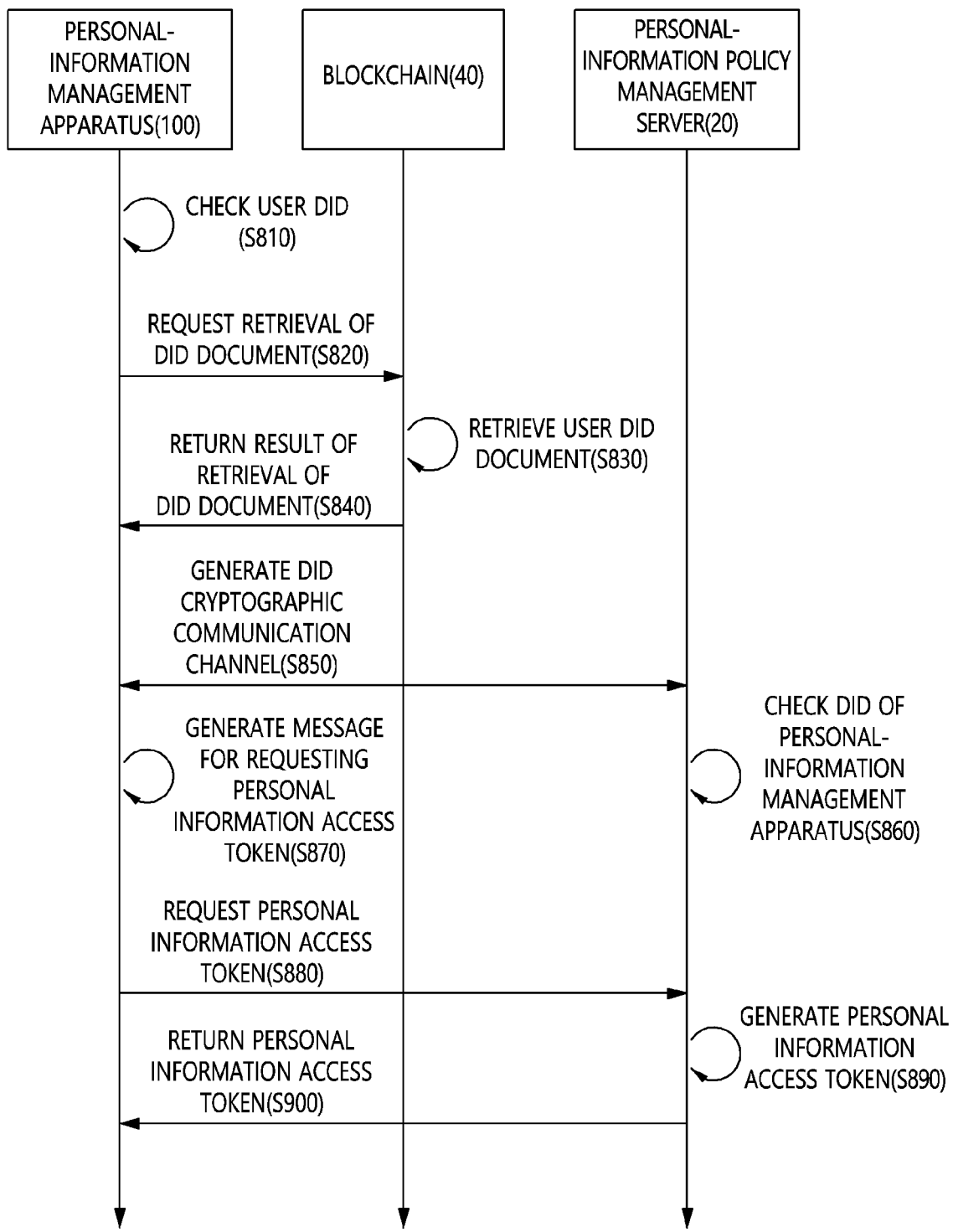
FIG. 15 is a sequence diagram illustrating a process of requesting a personal information access token according to an embodiment of the present invention.

FIG. 15 is a sequence diagram illustrating the process of requesting a personal information access token according to an embodiment of the present invention.

At step S810, a personal-information management apparatus 100 may receive the user DID of the user whose personal information is to be retrieved, and may check the user DID to retrieve.

At step S820, the personal-information management apparatus 100 may request a blockchain 40 to retrieve a user DID document corresponding to the user DID.

At step S830, the blockchain 40 may retrieve the user DID document.

At step S840, the blockchain 40 may return the retrieved user DID document.

Here, at step S840, the personal-information management apparatus 100 may identify the endpoint as the personal-information policy management server 20 of the user based on 'type privacyPolicyService' that is written in the 'service' attribute information of the user DID document.

At step S850, the personal-information management apparatus 100 may establish a DID cryptographic communication channel with the retrieved personal-information policy management server 20.

At step S860, the personal-information policy management server 20 may check the service DID of the personal-information management apparatus 100.

At step S870, the personal-information management apparatus 100 may generate a personal information access token request statement.

Here, at step S870, the personal-information management apparatus 100 may generate a personal information access token request statement including the service DID of the personal-information management apparatus 100, the user DID, and the information to request (personal information such as a name, a phone number, and the like).

At step S880, the personal-information management apparatus 100 may transmit the generated personal information access token request statement to the personal-information policy management server 20.

At step S890, the personal-information policy management server 20 may verify the personal information access token request statement, and may generate a personal information access token when the verification succeeds.

Here, at step S890, the personal-information policy management server 20 may verify whether the personal-information management apparatus 100 is permitted to retrieve the personal information of the user.

Here, at step S890, the personal-information policy management server 20 may decrypt the personal information access token request statement, and may verify the personal information access policy included in the personal information access token request statement.

Here, at step S890, the personal-information policy management server 20 may retrieve the personal information access policy corresponding to the user DID based on the personal information access token request statement, and may determine whether the personal-information management apparatus 100 is permitted to retrieve the personal information based on the personal information access policy and the service DID of the personal-information management apparatus 100.

Here, at step S890, the personal-information policy management server 20 retrieves the personal information access policy based on the user DID and checks whether the service DID registered as the subject in the personal information access policy matches the service DID included in the personal information access token request statement, thereby checking permission to retrieve the personal information.

Here, at step S890, when it is determined that the personal-information management apparatus 100 is permitted to retrieve the personal information, a personal information access token, including the policy DID of the personal-information policy management server 20 and information about the endpoint that manages the personal information, may be generated.

Here, at step S890, when it is determined that the personal-information management apparatus 100 is not permitted to retrieve the personal information, notification for controlling the access to the personal information of the user, which includes information about the personal-information management apparatus 100, may be transmitted to a user terminal device 10.

Here, at step S890, when the user terminal device 10 permits the access by the personal-information management apparatus 100 by returning a personal information access permission statement, the service DID of the personal-information management apparatus 100 may be automatically added to the personal information access policy or the policy may be modified, and a personal information access token for permitting the retrieval of the personal information may be generated and returned to the personal-information management apparatus 100.

The personal information access token may include an operation (retrieval), the DID of the requestor (service DID), the DID of the subject (user DID), the requested information (a name, a phone number and the like), permissions (read), the location of personal information storage (information about the endpoint), a signature creator (the policy DID of the personal-information policy management server 20), a signature (signed with the private key of the policy DID of the personal-information policy management server 20), and the like.

The information about the endpoint may be the location thereof, may be the user terminal information (Google FCM information and the like) for a push service when the endpoint is the user terminal device 10, or may be the trust DID of a trusted personal-information management server 30 when the endpoint is the trusted personal-information management server 30.

At step S900, the personal-information policy management server 20 may transmit the generated personal information access token to the personal-information management apparatus 100.

Here, at step S900, a personal information access token response statement including the personal information access token may be generated, encrypted and transmitted to the personal-information management apparatus 100.

Here, at step S900, the personal-information management apparatus 100 may identify the endpoint for managing the personal information from the personal information access token.

Here, at step S900, the personal-information management apparatus 100 may acquire the user terminal information for requesting a push service of the user terminal device 10 or the trust DID of the trusted personal-information management server 30 depending on the endpoint identified from the personal information access token.

Figure 16:
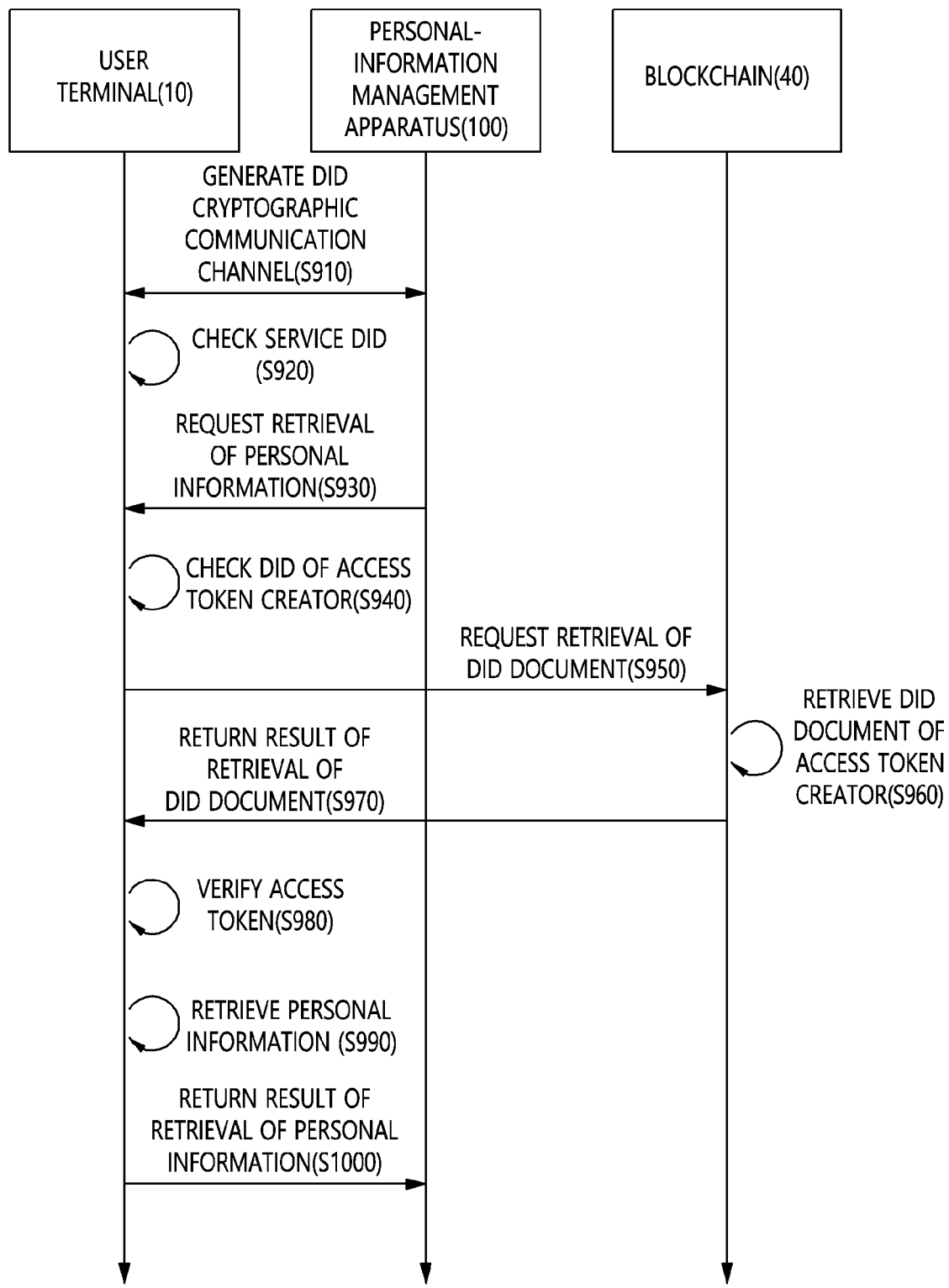
FIG. 16 is a sequence diagram illustrating a process in which a user terminal retrieves personal information according to an embodiment of the present invention.

FIG. 16 is a sequence diagram illustrating a process in which a user terminal retrieves personal information according to an embodiment of the present invention.

Referring to FIG. 16, at step S910, a personal-information management apparatus 100 may establish a DID cryptographic communication channel with a user terminal device 10 using user terminal information (e.g., Google FCM) for a push service, which is identified from a personal information access token.

At step S920, the user terminal device 10 may identify the service DID of the personal-information management apparatus 100.

At step S930, the personal-information management apparatus 100 may deliver a request to retrieve the personal information and the personal information access token together to the user terminal device 10 based on the DID cryptographic communication channel.

At step S940, the user terminal device 10 may check the policy DID of a personal-information policy management server 20, which is the issuer of the access token, the policy DID being included in the personal information access token.

At step S950, the user terminal device 10 may request a blockchain 40 to retrieve the DID document of the issuer of the access token in order to check if the policy DID corresponds to the personal-information policy management server 20.

At step S960, the blockchain 40 may retrieve a DID document for the DID.

At step S970, the blockchain 40 may transmit the DID document for the DID to the user terminal device 10.

At step S980, the user terminal device 10 may acquire a public key from the DID document received from the blockchain 40, and may verify the signature of the personal information access token using the public key.

Here, at step S980, the user terminal device 10 may verify the attribute information of the personal information access token. First, whether the DID of the subject written in the access token matches the user DID of the user terminal device 10 may be checked, and then whether the service DID, which is checked at the time of establishing the DID cryptographic communication channel, matches the DID of the requestor written in the access token may be checked.

At step S990, when both verification of the signature of the personal information access token and verification of the attribute information are completed, the user terminal device 10 may store a log on the provision of the personal information, and may retrieve the personal information of the user, which is requested by the personal-information management apparatus 100, from the local DB thereof.

At step S1000, the user terminal device 10 may provide the retrieved personal information to the personal-information management apparatus 100.

Figure 17:
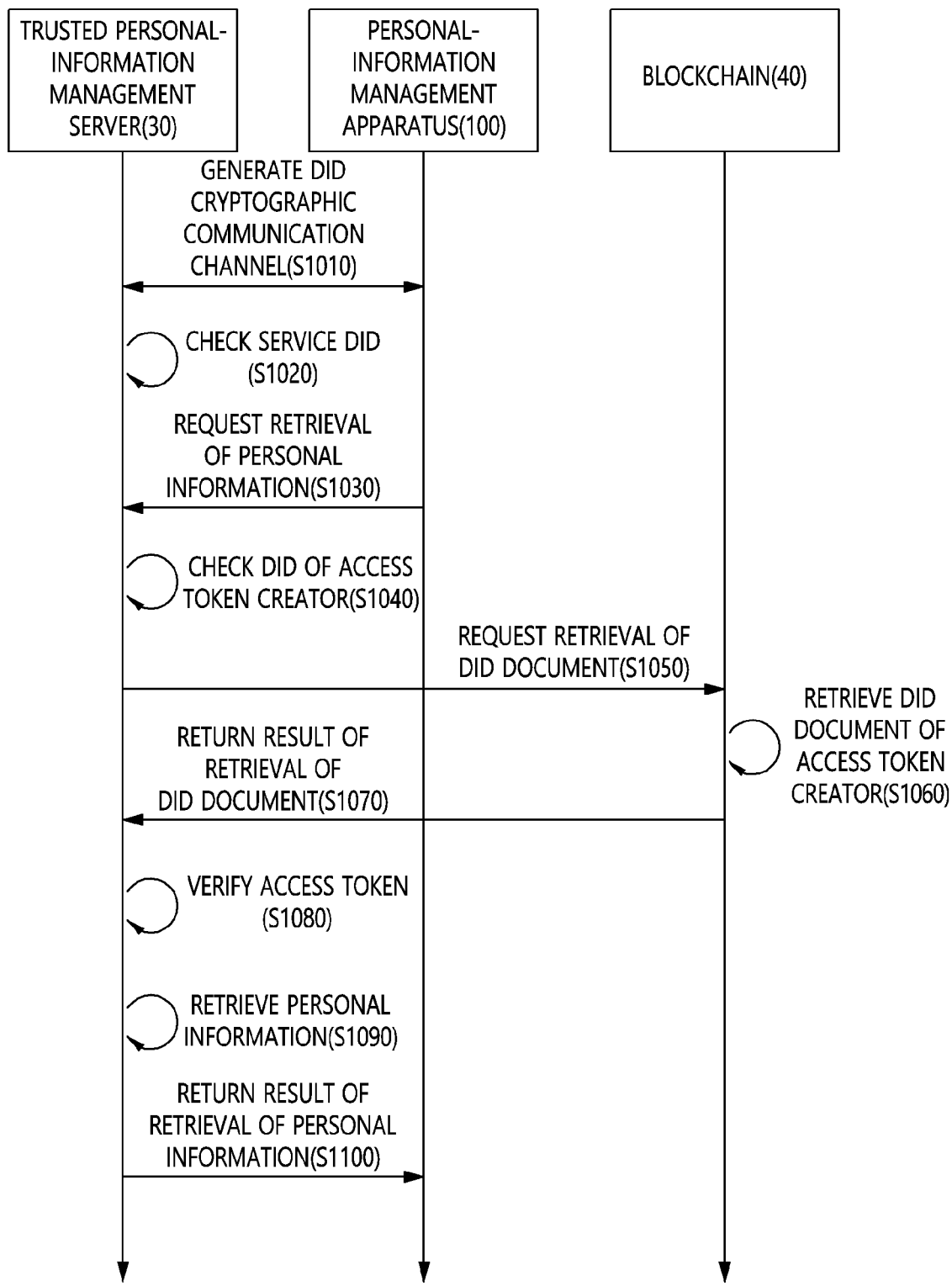
FIG. 17 is a sequence diagram illustrating a process in which a trusted personal-information management server retrieves personal information according to an embodiment of the present invention.

FIG. 17 is a sequence diagram illustrating a process in which a trusted personal-information management server retrieves personal information according to an embodiment of the present invention.

Referring to FIG. 17, at step S1010, a personal-information management apparatus 100 may establish a DID cryptographic communication channel with a trusted personal-information management server 30 using the trust DID of the trusted personal-information management server 30, which is identified from a personal information access token.

At step S1020, the trusted personal-information management server 30 may identify the service DID of the personal-information management apparatus 100.

At step S1030, the personal-information management apparatus 100 may deliver a request to retrieve personal information and the personal information access token together to the trusted personal-information management server 30 based on the DID cryptographic communication channel.

At step S1040, the trusted personal-information management server 30 may identify the policy DID of a personal-information policy management server 20, which is the issuer of the access token, the policy DID being included in the personal information access token.

At step S1050, the trusted personal-information management server 30 may request a blockchain 40 to retrieve the DID document of the issuer of the access token in order to check if the policy DID corresponds to the personal-information policy management server 20.

At step S1060, the blockchain 40 may retrieve the DID document for the DID.

At step S1070, the blockchain 40 may transmit the DID document for the DID to the trusted personal-information management server 30.

At step S1080, the trusted personal-information management server 30 may acquire a public key from the DID document received from the blockchain 40, and may verify the signature of the personal information access token using the public key.

Here, at step S1080, the trusted personal-information management server 30 may verify the attribute information of the personal information access token. First, whether the DID of the subject written in the access token matches the user DID of the user terminal device 10 may be checked, and then whether the service DID that is checked at the time of establishing the DID cryptographic communication channel matches the DID of the requester written in the access token may be checked.

At step S1090, when both verification of the signature of the personal information access token and verification of the attribute information are completed, the trusted personal-information management server 30 may store a log on the provision of the personal information and retrieve the personal information of the user, requested by the personal-information management apparatus 100, from the local DB thereof.

At step S1100, the trusted personal-information management server 30 may provide the retrieved personal information to the personal-information management apparatus 100.

Figure 18:
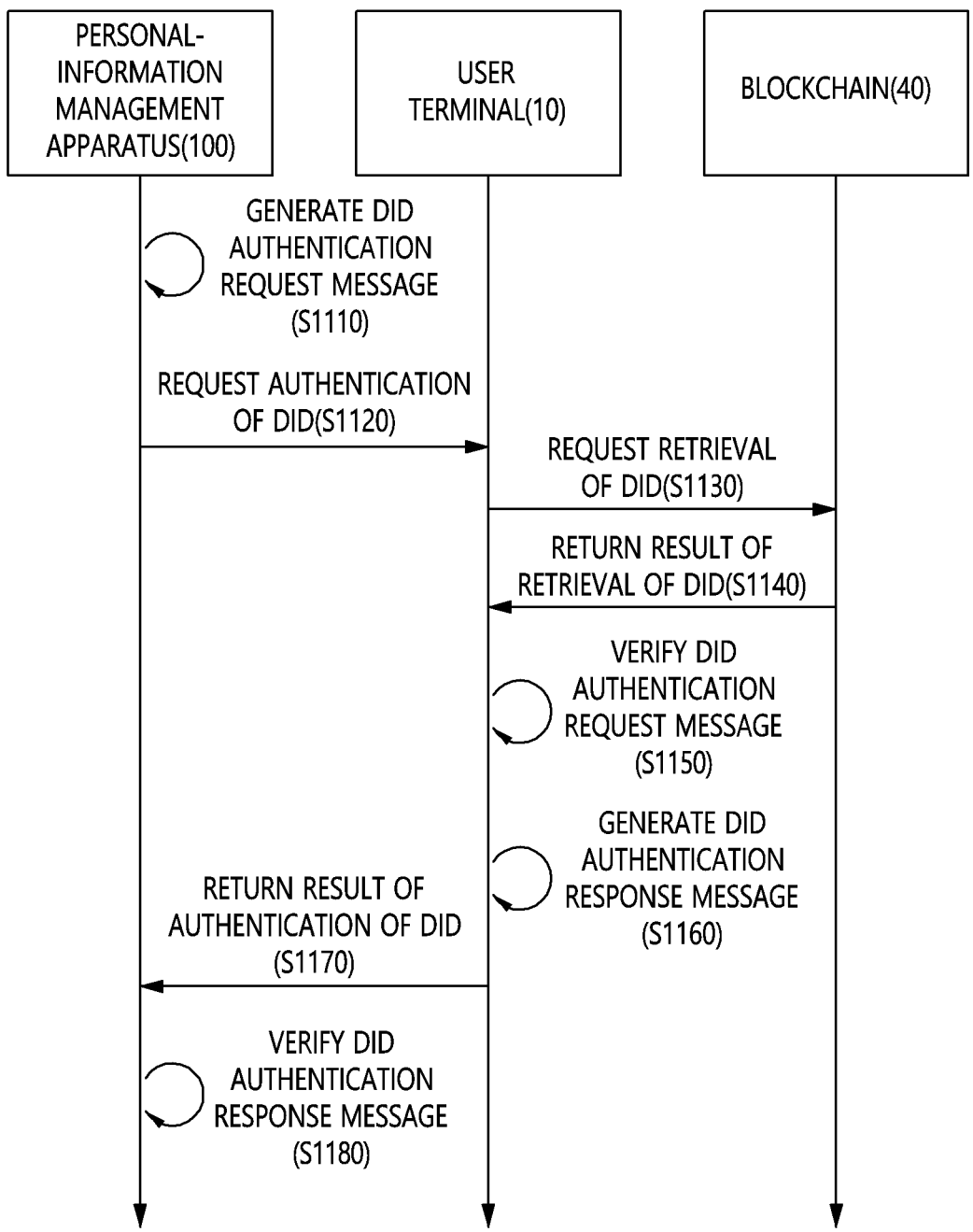
FIG. 18 is a view illustrating a process of establishing a DID cryptographic communication channel according to an embodiment of the present invention.

FIG. 18 is a view illustrating a process of establishing a DID cryptographic communication channel according to an embodiment of the present invention.

Referring to FIG. 18, it can be seen that an example of establishment of a DID cryptographic communication channel at step S850 of FIG. 15, at step S910 of FIG. 16, and at step S1010 of FIG. 17 is illustrated in detail.

Although the process of establishing a DID cryptographic communication channel between a personal-information management apparatus 100 and a user terminal device 10 is illustrated in FIG. 18, the personal-information management apparatus 100 may also establish a DID cryptographic communication channel with a personal-information policy management server 20 or a trusted personal-information management server 30.

First, at step S1110, the personal-information management apparatus 100 may generate a DID authentication request message including a service DID for establishing a DID cryptographic communication channel.

Here, at step S1110, the personal-information management apparatus 100 may identify the URL of the service endpoint for DID authentication, and may identify the same also through the retrieved DID document of the user terminal device 10.

Here, at step S1110, the personal-information management apparatus 100 may generate a pair of keys (privKey, pubKey) for generating a session key.

Here, the DID authentication request message may include the service DID, the pubKey for generating a session key, key-related encryption parameters (p, g), the publicKeyiD of the service DID document for verifying a signature, and the signature (using the private key of publicKeyiD).

At step S1120, the personal-information management apparatus 100 may request DID authentication by transmitting the DID authentication request message to the user terminal device 10.

At step S1130, the user terminal device 10 may request a blockchain 40 to retrieve a service DID document using the service DID included in the DID authentication request message.

At step S1140, the blockchain 40 may transmit the service DID document for the service DID to the user terminal device 10.

At step S1150, the user terminal device 10 may verify the signature of the DID authentication request message using the public key identified using publicKeyiD included in the service DID document.

Here, at step S1150, when verification of the DID authentication request message succeeds, the user terminal device 10 may generate a key pair for generating a session key, and may generate the session key using the public key of the personal-information management apparatus 100 and privKey.

Here, at step S1150, the user terminal device 10 may store information about the session key in connection with the service DID.

At step S1160, the user terminal device 10 may generate a DID authentication response message.

The DID authentication response message may include the user DID, the pubKey for generating the session key, key-related encryption parameters (p, g), the publicKeyiD of the user DID document for verification of a signature, and the signature (using the private key of publicKeyiD).

At step S1170, the user terminal device 10 may transmit the DID authentication response message to the personal-information management apparatus 100.

At step S1180, the personal-information management apparatus 100 may verify the signature included in the DID authentication response message using the public key identified using publicKeyiD of the previously retrieved DID document of the user terminal device 10.

Here, at step S1180, when verification of the DID authentication response message succeeds, the personal-information management apparatus 100 may generate a session key using the public key of the user terminal device 10 and privKey.

Here, at step S1180, the personal-information management apparatus 100 may store the information about the session key in connection with the service DID.

Here, the personal-information management apparatus 100 may establish a DID cryptographic communication channel based on the session key.

Figure 19:
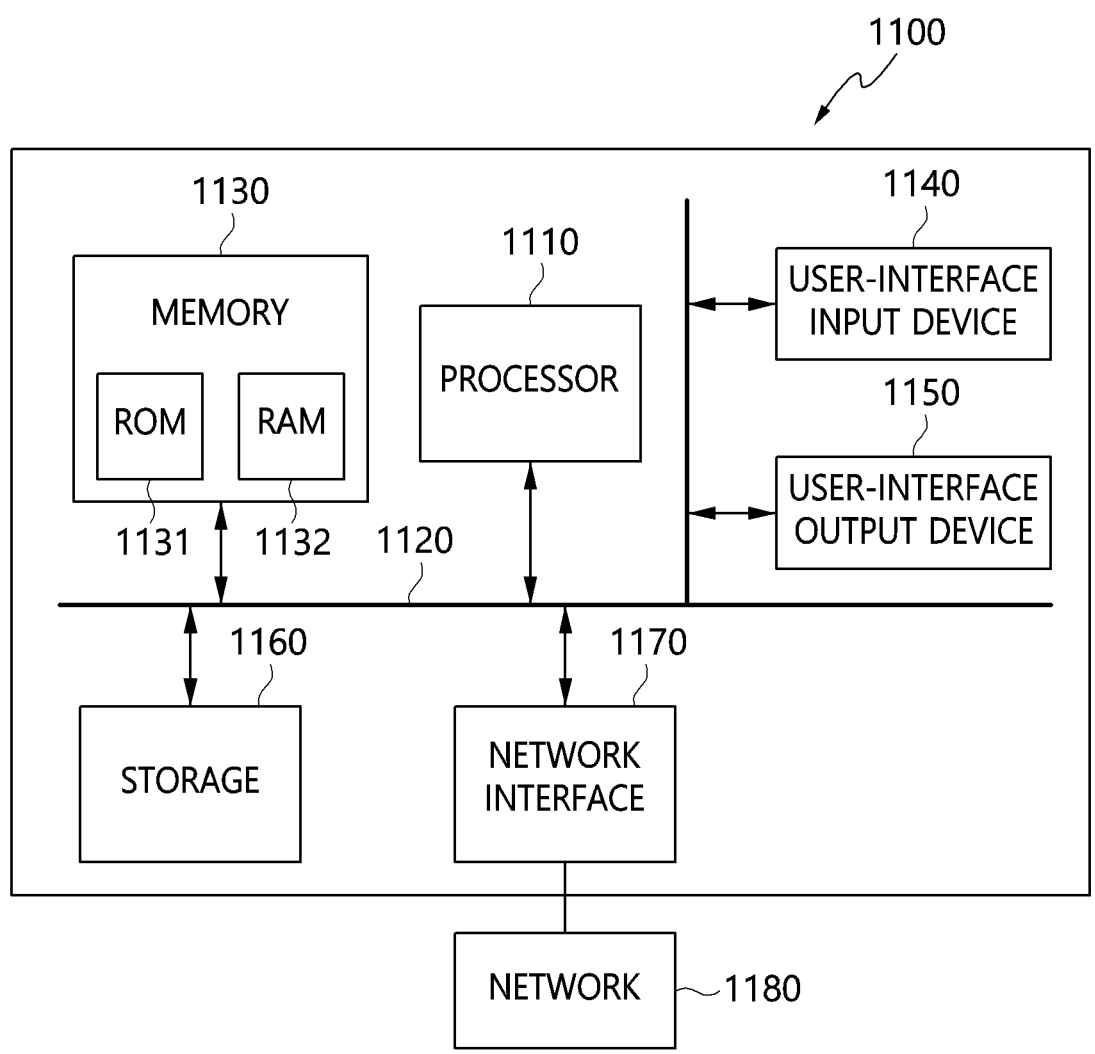
FIG. 19 is a view illustrating a computer system according to an embodiment of the present invention.

FIG. 19 is a view illustrating a computer system according to an embodiment of the present invention.

Referring to FIG. 19, the personal-information management apparatus 100, the user terminal device 10, and the nodes of the blockchain system 40 according to an embodiment of the present invention may be implemented in a computer system 1100 including a computer-readable recording medium. As illustrated in FIG. 19, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage

1160 may be any of various types of volatile or nonvolatile storage media. For example, the memory may include ROM 1131 or RAM 1132.

The apparatus for managing personal information according to an embodiment of the present invention includes one or more processors 1110 and executable memory 1130 for storing at least one program executed by the one or more processors 1110. The at least one program may receive the decentralized identifier of a user, retrieve decentralized identification information of the user, corresponding to the decentralized identifier of the user, from a blockchain, request a personal information access token for accessing the personal information of the user from a first server using the decentralized identification information of the user, identify an endpoint for managing the personal information of the user from the personal information access token, which is generated based on a personal information access policy for the personal information, and retrieve the personal information of the user from the endpoint. The user terminal device of the user may register the decentralized identification information of the user in the blockchain, receive the personal information of the user, store the same in the endpoint for managing the personal information of the user, and register the personal information access policy for the personal information in the first server.

Here, the user terminal device may transmit a personal information access policy generation request statement, which includes the decentralized identifier of the endpoint for managing the personal information, to the first server.

Here, the endpoint may be any one of the user terminal device and a second server.

Here, the user terminal device may transmit a personal information access policy registration statement, including the decentralized identifier of the user and the personal information access policy, to the first server, and the first server may register the personal information access policy when the decentralized identification information of the user is retrieved from the blockchain using the decentralized identifier of the user.

Here, when the decentralized identification information of the user is retrieved, the first server may verify the signature of the personal information access policy registration statement, which is signed with the private key of the decentralized identifier of the user, using the public key of the decentralized identifier of the user.

Here, the at least one program may transmit a personal information access token request statement, which includes the decentralized identifier of the personal-information management apparatus and the decentralized identifier of the user, to the first server.

Here, the first server may retrieve the personal information access policy corresponding to the decentralized identifier of the user based on the personal information access token request statement, and may determine whether the personal-information management apparatus is permitted to retrieve the personal information based on the personal information access policy and the decentralized identifier of the personal-information management apparatus.

Here, when it is determined that the personal-information management apparatus is permitted to retrieve the personal information, the first server may generate a personal information access token by including the decentralized identifier of the first server therein as the decentralized identifier of a policy manager and by including information about the endpoint for managing the personal information therein.

Here, the endpoint may receive a personal information retrieval request statement, in which the personal information access token is included, from the personal-information management apparatus, and may receive the decentralized identification information of a policy creator from the blockchain using the decentralized identifier of the policy creator included in the personal information access token.

Here, when it is determined that the policy creator is the first server based on the decentralized identification information of the policy creator, the endpoint may determine that verification of the personal information access token succeeds, and may transmit the personal information of the user to the personal-information management apparatus.

The present invention enables a user to directly store and manage his/her personal information, to set access permissions for provision of the personal information to third parties, and to directly control whether to provide his/her personal information.

Also, the present invention may ensure security for sharing personal information by establishing a secure P2P cryptographic communication channel, and may check and validate details on the use of the personal information in real time.

As described above, the apparatus and method for managing personal information according to the present invention are not limitedly applied to the configurations and operations of the above-described embodiments, but all or some of the embodiments may be selectively combined and configured, so that the embodiments may be modified in various ways.

What is claimed is:

1. A method for managing personal information, performed by a personal-information management apparatus, comprising:
    registering, by a user terminal device, decentralized identification information of a user in a blockchain;
    receiving, by the user terminal device, personal information of the user;
    storing, by the user terminal device, the personal information in an endpoint for managing the personal information of the user;
    registering, by the user terminal device, a personal information access policy for the personal information in a first server;
    receiving, by the personal-information management apparatus, a decentralized identifier of the user;
    retrieving, by the personal-information management apparatus, the decentralized identification information of the user, corresponding to the decentralized identifier of the user, from the blockchain;
    requesting, by the personal-information management apparatus, a personal information access token for accessing the personal information from the first server using the decentralized identification information of the user;
    identifying, by the personal-information management apparatus, the endpoint for managing the personal information of the user from the personal information access token that is generated based on the personal information access policy for the personal information; and
    retrieving, by the personal-information management apparatus, the personal information of the user from the endpoint.

2. The method of claim 1, wherein registering the personal information access policy is configured such that the user terminal device transmits a personal information access policy generation request statement, including a decentralized identifier of the endpoint for managing the personal information, to the first server.

3. The method of claim 2, wherein the endpoint for managing the personal information is any one of the user terminal device and a second server.

4. The method of claim 3, wherein registering the personal information access policy is configured such that the user terminal device transmits a personal information access policy registration statement, including the decentralized identifier of the user and the personal information access policy, to the first server and such that the first server registers the personal information access policy when the decentralized identification information of the user is retrieved from the blockchain using the decentralized identifier of the user.

5. The method of claim 4, wherein registering the personal information access policy is configured such that, when the decentralized identification information of the user is retrieved, the first server verifies a signature of the personal information access policy registration statement, which is signed with a private key of the decentralized identifier of the user, using a public key of the decentralized identifier of the user.

6. The method of claim 1, wherein requesting the personal information access token is configured such that the personal-information management apparatus transmits a personal information access token request statement, including a decentralized identifier of the personal-information management apparatus and the decentralized identifier of the user, to the first server.

7. The method of claim 6, wherein requesting the personal information access token is configured such that the first server retrieves the personal information access policy corresponding to the decentralized identifier of the user based on the personal information access token request statement and determines whether retrieval of the personal information is permitted based on the personal information access policy and the decentralized identifier of the personal-information management apparatus.

8. The method of claim 7, wherein requesting the personal information access token is configured such that, when it is determined that the personal-information management apparatus is permitted to retrieve the personal information, the first server generates the personal information access token by including a decentralized identifier of the first server therein as a decentralized identifier of a policy manager and including information about the endpoint for managing the personal information therein.

9. The method of claim 8, wherein requesting the personal information access token is configured such that, when it is determined that the personal-information management apparatus is not permitted to retrieve the personal information, the first server transmits notification to the user terminal device, and then modifies the personal information access policy only when permission to retrieve the personal information is obtained from the user terminal device, thereby generating the personal information access token.

10. The method of claim 1, wherein retrieving the personal information of the user is configured such that the endpoint receives a personal information retrieval request statement including the personal information access token from the personal-information management apparatus and receives decentralized identification information of a policy creator from the blockchain using a decentralized identifier of the policy creator included in the personal information access token.

11. The method of claim 10, wherein retrieving the personal information of the user is configured such that, when the policy creator is determined to be the first server based on the decentralized identification information of the policy creator, the endpoint determines that verification of the personal information access token succeeds and transmits the personal information of the user to the personal-information management apparatus.

12. The method of claim 11, wherein retrieving the personal information of the user is configured such that the endpoint establishes a cryptographic communication channel with the personal-information management apparatus based on decentralized identification information of the personal-information management apparatus, receives the personal information retrieval request statement through the cryptographic communication channel, and transmits the personal information through the cryptographic communication channel.

13. An apparatus for managing personal information, comprising:
    one or more processors; and
    executable memory for storing at least one program executed by the one or more processors,
    wherein the at least one program is configured to:
        receive a decentralized identifier of a user;
        retrieve decentralized identification information of the user, corresponding to the decentralized identifier of the user, from a blockchain;
        request a personal information access token for accessing the personal information from a first server using the decentralized identification information of the user;
        identify an endpoint for managing the personal information of the user from the personal information access token that is generated based on a personal information access policy for the personal information; and
    retrieve the personal information of the user from the endpoint,
    wherein the at least one program transmits a personal information access token request statement, including a decentralized identifier of the apparatus and the decentralized identifier of the user, to the first server,
    wherein the first server retrieves the personal information access policy, corresponding to the decentralized identifier of the user, based on the personal information access token request statement and determines whether retrieval of the personal information is permitted based on the personal information access policy and the decentralized identifier of the apparatus; and
    wherein, when it is determined that the apparatus is permitted to retrieve the personal information, the first server generates the personal information access token by including a decentralized identifier of the first server therein as a decentralized identifier of a policy manager and including information about the endpoint for managing the personal information therein.

14. The apparatus of claim 13, wherein the personal information access policy is generated in such a way that a user terminal device of the user registers the decentralized identification information of the user in the blockchain, receives the personal information of the user, stores the personal information in the endpoint for managing the personal information of the user, and transmits a personal information access policy generation request statement, including a decentralized identifier of the endpoint for managing the personal information, to the first server.

15. The apparatus of claim 14, wherein the personal information access policy is registered in the first server when the decentralized identification information of the user is retrieved from the blockchain using the decentralized identifier of the user after the user terminal device transmits a personal information access policy registration statement, including the decentralized identifier of the user and the personal information access policy, to the first server.

16. The apparatus of claim 13, wherein the endpoint receives a personal information retrieval request statement including the personal information access token from the apparatus and receives decentralized identification information of a policy creator from the blockchain using a decentralized identifier of the policy creator included in the personal information access token.

17. The apparatus of claim 16, wherein, when the policy creator is determined to be the first server based on the decentralized identification information of the policy creator, the endpoint determines that verification of the personal information access token succeeds, and transmits the personal information of the user to the apparatus.

\* \* \* \* \*